(12) United States Patent
Jahns et al.

(10) Patent No.: US 10,336,912 B2
(45) Date of Patent: Jul. 2, 2019

(54) METHODS FOR PRODUCING AND USING AQUEOUS POLYURETHANE/POLYACRYLATE HYBRID DISPERSIONS AND USE OF SAID AQUEOUS POLYURETHANE/POLYACRYLATE HYBRID DISPERSIONS IN COATING AGENTS

(71) Applicant: BASF SE, Ludwigshafen (DE)

(72) Inventors: Ekkehard Jahns, Weinheim (DE); Timo Mangel, Oetigheim (DE); Christine Roesch, Mainz (DE); Paola Romanato, Muttenz (CH); Yeni Burk, Ludwigshafen (DE); Joachim Pakusch, Speyer (DE)

(73) Assignee: BASF SE, Ludwigshafen (DE)

( * ) Notice: Subject to any disclaimer, the term of this patent is extended or adjusted under 35 U.S.C. 154(b) by 102 days.

(21) Appl. No.: 15/500,821

(22) PCT Filed: Jul. 29, 2015

(86) PCT No.: PCT/EP2015/067338
§ 371 (c)(1),
(2) Date: Jan. 31, 2017

(87) PCT Pub. No.: WO2016/016286
PCT Pub. Date: Feb. 4, 2016

(65) Prior Publication Data
US 2017/0226377 A1 Aug. 10, 2017

(30) Foreign Application Priority Data
Aug. 1, 2014 (EP) .................................. 14179534

(51) Int. Cl.
| | |
|---|---|
| C08K 5/42 | (2006.01) |
| C09D 175/08 | (2006.01) |
| C08F 2/16 | (2006.01) |
| C08G 18/66 | (2006.01) |
| C08G 18/72 | (2006.01) |
| C08G 18/75 | (2006.01) |
| C08F 283/00 | (2006.01) |
| C08G 18/08 | (2006.01) |
| C08G 18/12 | (2006.01) |
| C08G 18/22 | (2006.01) |
| C08G 18/24 | (2006.01) |
| C08G 18/28 | (2006.01) |
| C09D 175/06 | (2006.01) |
| C08G 18/42 | (2006.01) |
| C09D 7/61 | (2018.01) |
| C08G 18/32 | (2006.01) |
| C08G 18/40 | (2006.01) |
| C08K 3/00 | (2018.01) |
| E04D 7/00 | (2006.01) |

(52) U.S. Cl.
CPC .............. *C09D 175/08* (2013.01); *C08F 2/16* (2013.01); *C08F 283/006* (2013.01); *C08G 18/0828* (2013.01); *C08G 18/0866* (2013.01); *C08G 18/12* (2013.01); *C08G 18/227* (2013.01); *C08G 18/246* (2013.01); *C08G 18/283* (2013.01); *C08G 18/3206* (2013.01); *C08G 18/4018* (2013.01); *C08G 18/4238* (2013.01); *C08G 18/6607* (2013.01); *C08G 18/6674* (2013.01); *C08G 18/722* (2013.01); *C08G 18/755* (2013.01); *C08G 18/758* (2013.01); *C08K 3/00* (2013.01); *C08K 5/42* (2013.01); *C09D 7/61* (2018.01); *C09D 175/06* (2013.01); *E04D 7/00* (2013.01)

(58) Field of Classification Search
CPC .......... C08K 5/42; C08F 283/006; C08F 2/16
See application file for complete search history.

(56) References Cited

U.S. PATENT DOCUMENTS

| | | |
|---|---|---|
| 3,412,054 A | 11/1968 | Milligan et al. |
| 3,905,929 A | 9/1975 | Noll |
| 3,920,598 A | 11/1975 | Reiff et al. |
| 4,192,937 A | 3/1980 | Noll et al. |
| 4,269,748 A | 5/1981 | Nachtkamp et al. |
| 4,269,749 A | 5/1981 | Marriott et al. |
| 4,292,226 A | 9/1981 | Wenzel et al. |
| 4,733,005 A | 3/1988 | Schmidt et al. |
| 5,629,402 A | 5/1997 | Pedain et al. |
| 7,358,295 B2 | 4/2008 | Miller et al. |

(Continued)

FOREIGN PATENT DOCUMENTS

| | | |
|---|---|---|
| CA | 1 129 128 A | 8/1982 |
| DE | 1 495 745 A | 6/1969 |

(Continued)

*Primary Examiner* — Peter D. Mulcahy
(74) *Attorney, Agent, or Firm* — Oblon, McClelland, Maier & Neustadt, L.L.P.

(57) ABSTRACT

The present invention provides an aqueous polyurethane (PU)-polyacrylate hybrid dispersion obtainable by free radical polymerization of at least one acrylate polymer (A1) in the presence of at least one polyurethane (P1), a process for preparing these aqueous polyurethane-polyacrylate hybrid dispersions, wherein said process comprises a) preparing an aqueous polyurethane dispersion and b) using the polyurethane dispersion thus prepared as raw material for the further synthesis of a polyacrylate dispersion, and the use of the hybrid dispersion thus obtained as binder in filled coating materials, particularly as a binder for flexible roof coatings.

24 Claims, No Drawings

(56) References Cited

U.S. PATENT DOCUMENTS

| | | | | |
|---|---|---|---|---|
| 2004/0167252 A1* | 8/2004 | Melchiors | ........... | C08F 283/006 524/13 |
| 2008/0075685 A1 | 3/2008 | Baxter et al. | | |
| 2015/0045491 A1 | 2/2015 | Zhang et al. | | |

FOREIGN PATENT DOCUMENTS

| | | |
|---|---|---|
| DE | 1 954 090 | 5/1971 |
| DE | 2 034 479 A | 1/1972 |
| DE | 1 248 943 C2 | 3/1974 |
| DE | 39 11 827 A1 | 10/1990 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 199 59 653 A1 | 6/2001 |
| DE | 101 61 156 A1 | 6/2003 |
| EP | 0 081 083 A2 | 6/1983 |
| EP | 0 622 378 A1 | 11/1994 |
| EP | 0 771 328 | 5/1997 |
| EP | 0 789 724 | 8/1997 |
| EP | 1 903 065 A2 | 3/2008 |
| EP | 1903065 A2 * | 3/2008 |
| EP | 2 666 800 A1 | 11/2013 |
| WO | WO 95/33775 A1 | 12/1995 |
| WO | WO 96/14355 A1 | 5/1996 |
| WO | WO 99/25780 A1 | 5/1999 |
| WO | WO 2011/000035 A1 | 1/2011 |
| WO | WO 2012/084668 A1 | 6/2012 |
| WO | WO 2012/130762 A1 | 10/2012 |
| WO | WO 2013/073145 A1 | 5/2013 |
| WO | WO 2013/139019 A1 | 9/2013 |
| WO | WO -2013-139019 A1 * | 9/2013 |

* cited by examiner

METHODS FOR PRODUCING AND USING AQUEOUS POLYURETHANE/POLYACRYLATE HYBRID DISPERSIONS AND USE OF SAID AQUEOUS POLYURETHANE/POLYACRYLATE HYBRID DISPERSIONS IN COATING AGENTS

The present invention provides an aqueous polyurethane (PU)-polyacrylate hybrid dispersion obtainable by radical polymerization of at least one acrylate polymer (A1) in the presence of at least one polyurethane (P1), a process for preparing these aqueous polyurethane-polyacrylate hybrid dispersions, wherein said process comprises a) preparing an aqueous polyurethane dispersion and b) using the polyurethane dispersion thus prepared as raw material for the further synthesis of a polyacrylate dispersion, and the use of the hybrid dispersion thus obtained as binder in filled coating materials, particularly as a binder for flexible roof coatings.

Aqueous polyurethane dispersions are used as low-solvent or solvent-free coating materials for lacquering wood, as leather lacquers and as printing ink binders. These applications usually involve clear lacquers or pigmented coatings. The advantage of these coatings based on aqueous polyurethane dispersions is that the microphase morphology can be controlled by choosing the relative proportions of hard and soft segments along the polymer chains in the polyurethane. The mechanical properties are particularly noteworthy: High abrasion resistance, very good hardness, more specifically toughness, good elastic properties, in particular very good low-temperature elasticity.

Aqueous acrylate polymer dispersions are common general knowledge. They are fluid systems comprising, as a disperse phase in an aqueous dispersion medium, polymer knots consisting of a plurality of entangled polymer chains, known as the polymer matrix or polymer beads, in disperse distribution. The mean diameter of the polymer beads is often in the range of from 10 to 1000 nm, more particularly in the range of from 50 to 500 nm. Aqueous polymer dispersions are used as binders in a multitude of industrial applications. The polymer dispersions generally consist of the styrene acrylate, straight acrylate, vinyl acetate or styrene butadiene classes of raw materials.

Polyurethane dispersions are distinctly more costly to prepare than acrylate dispersions. As a result, attempts have been made time and again to prepare mixtures of polyurethane and acrylate dispersions. This may firstly be effected by simple physical mixing of the two separately prepared dispersion types as is described in WO2011/00035 for example. However, the disadvantage is that practically all properties are usually also only realized as a mixture and it is not possible to bring to the fore particular advantages of one technology or the other of the dispersions as desired.

The second option is chemical combination of the two dispersions which may then be chemically coupled to one another in suitable fashion via a reaction. In this case there are distinctly more synthetic options to bring advantages of one technology or the other to the hybrid of both technologies. Chemically bonded PU-acrylate hybrids are therefore capable of exhibiting improved properties compared to simple physical mixtures.

Currently, polyurethane dispersions are generally employed in non-filled lacquers, for example leather or wood coatings. Clear lacquers or merely pigmented coatings comprising very little or no filler are generally employed here. Attempting to employ these binders in water-based paints having a relatively high filler content leads to distinct instabilities.

The proportion of fillers/pigments may be described by the pigment volume concentration (PVC). The pigment volume concentration expresses the volume ratio of pigments/fillers to binder in the cured lacquer film. Calculating the pigment volume concentration comprises initially calculating the volumes of the individual pigments, fillers and binders from the amounts (masses) and densities thereof (A. Goldschmidt, H.-J. Streitberger; BASF Handbuch Lackiertechnik; 2002; Vincentz Verlag). The obtained volumes of the pigments and fillers comprised in the formulation are then divided by the volumes of all solid raw materials.

For simplicity, the additives likewise present in the formula are typically not taken into account in the calculation. Solvent and water are in any case no longer present in the dried coating and are not taken into account when calculating the PVC.

The PVC is typically expressed in % and is between 0% (clear lacquer with no pigments or fillers) and 100% (only theoretically possible since no binders).

Coating materials according to the invention have, for example, a PVC in the range of from 5 to 85, it being appreciated that the binders are also suitable for use in clear lacquer applications comprising no or only very small proportions of added pigments and/or fillers. It is particularly preferable for flexible roof coatings to employ coatings having a PVC of about 10 to 40.

Typical prior art polyurethane dispersions are generally not "filler compatible". It is thus necessary to modify existing aqueous polyurethane dispersions to make them more filler compatible. Otherwise, the PU-acrylate hybrids prepared therefrom are not sufficiently filler compatible either, a basic requirement for typical paint and coating applications having a medium to high filler content.

U.S. Pat. No. 5,629,402 describes coatings comprising polyurethane dispersions, said coatings being extremely permeable to water vapor while showing only a low tendency toward swellability in water. The polyurethane dispersions comprise ionic groups and polyethylene glycols as raw materials in the PU main chain and a crosslinking reagent. Applications described are water vapor-permeable coatings for flexible substrates, such as textiles, leather, paper and the like. However, use of the polyurethane dispersions described therein as raw materials affords only PU-acrylate hybrids having limited stability toward fillers.

There are also a multitude of patents describing polyurethane-polyacrylate hybrid dispersions. For instance, WO 2012/84668 describes polyurethane-polyacrylate hybrid dispersions obtainable by two-stage radical polymerization of ethylenically unsaturated compounds in the presence of at least one polyurethane (P1), wherein in a first stage at least one ethylenically unsaturated compound (e) is subjected to at least partial radical polymerization in the presence of the at least one polyurethane (P1), at least one redox initiator system (I) and at least one iron compound (F) and subsequently in a second stage at least one ethylenically unsaturated compound (f) is subjected to radical polymerization. However, the hybrid dispersions described therein show only limited stability toward fillers.

WO 2013/139019 describes polyurethane-polyacrylate hybrid dispersions obtainable by preparation of a polyurethane dispersion comprising co-use of dimethylolpropionic acid, addition of an acrylate monomer and/or styrene, neutralization and subsequent dispersal of the reaction mixture in water and subsequent addition of acrylate monomers and polymerization of the acrylate stage comprising co-use of from 1% to 3% of acid monomers. The disadvantage is the insufficient filler compatibility of these hybrids when employed in paints having a high filler content.

EP 2 666 800 describes polyurethane-polyacrylate hybrid dispersions and the use thereof for hair cosmetics composed of at least one sulfonated polyurethane and at least one acrylate polymer, the acrylate polymer comprising at least one carboxyl group-containing monomer and a chain transfer agent being used to prepare the acrylate. Hair cosmetics is cited as the field of application. However, the teaching of this application cannot be applied to the relatively high solids contents of polyurethane dispersions necessary for coatings. The described polyethylene glycol amounts in Examples 1 to 3 of 23% and 38% afford stable dispersions only at low solids contents of 15% and 19% respectively. Following the teaching of EP 2 666 800 does not give stable dispersions at solids contents of the dispersions as high as from >30% to 50% which are necessary for flexible roof coatings.

U.S. Pat. No. 7,358,295 describes polyurethane-polyacrylate hybrid dispersions as coatings for reducing electrostatic charge, the polyurethane portion of said dispersions comprising from 12 to 80 wt % of polyalkylene oxides in side chains. The acrylate portion likewise comprises polyalkylene oxide macromers having a molecular weight of 100-10 000. The hybrids described show insufficient filler compatibility when employed in paints having a high filler content.

The present invention had for its object the development of polyurethane-acrylate hybrid dispersions having distinctly improved filler compatibility compared to prior art polyurethane-polyacrylate hybrid dispersions and featuring particularly good properties in relation to toughness and elasticity, even at temperatures below freezing. These PU-acrylate hybrid dispersions should exhibit advantages over conventional acrylate dispersions particularly when used as binders for filled elastic paints and coatings such as for pasty tile adhesives, wetroom seals, flooring adhesives, primers, cementitious sealing slurries, sealants, mounting adhesives or for horizontal roof surfaces without exhibiting the high costs of pure polyurethane dispersions.

Surprisingly, this object was achieved by an aqueous polyurethane-polyacrylate hybrid dispersion obtainable by radical polymerization of an acrylate polymer (A1) in the presence of at least one polyurethane (P1) and at least one initiator system, wherein the at least one polyurethane (P1) has a content of polyalkylene oxide of at least 10 g/kg of polyurethane and a content of a sulfonated raw material of at least 25 mmol per kg of polyurethane and the acrylate polymer has a glass transition temperature of from −50° C. to 50° C. and the mass fraction of the polyurethane is at least 5% and no more than 95% based on the overall hybrid polymer.

The invention further provides a process for preparing the polyurethane-polyacrylate hybrid dispersion according to the invention, wherein said process comprises
(a) initially preparing the polyurethane (P1) and
(b) employing the polyurethane (P1) as seed for preparing the acrylate polymer (A1).

The present invention further provides for the use of the polyurethane-polyacrylate hybrid dispersion according to the invention as binders for elastic paints, pasty tile adhesives, wetroom seals, flooring adhesives, primers, cementitious sealing slurries, sealants, mounting adhesives or for flexible roof coatings, and also coating materials comprising the polyurethane-polyacrylate hybrid dispersions according to the invention.

Particular preference is given to the use of the polyurethane-polyacrylate hybrid dispersion according to the invention as binder for elastic paints and for flexible roof coatings.

The acrylate dispersion (A1) is, as described hereinbelow, preferably polymerized in a semi-batch process.

Particularly preferred polyurethane-polyacrylate hybrid dispersions comprise long-chain alkanol-based polyethylene oxides and sodium salts of 2-aminoethyl-2-aminoethanesulfonic acid, which are particularly filler compatible.

Preparing the PU-acrylate hybrids according to the invention comprises initially employing a polyurethane dispersion which is filler compatible. In order to achieve good filler compatibility, it may be necessary, here, for this PU dispersion to comprise more functional groups than is necessary or useful for a PU dispersion alone. Though this accordingly greater amount of hydrophilic groups in the PU dispersion contributes to greater water absorption of films of the pure PU dispersion, a PU-acrylate hybrid of such a particularly well stabilized PU dispersion need not necessarily exhibit excessive water absorption of a filled paint. On the contrary, these synthesis steps afforded prepared PU-acrylate hybrid dispersions which in fact exhibited lower levels of water absorption or water sensitivity of the filled paints prepared therefrom than was to be expected.

The polyurethanes (P1) according to the invention may be prepared by the following process as described in DE 10161156 the disclosure of which is hereby incorporated by reference in its entirety:

Aqueous dispersions comprising a polyurethane synthesized from
a) diisocyanates,
b) diols, of which
b1) from 10 to 100 mol %, based on the total amount of diols (b), have a molecular weight of from 500 to 5000, and
b2) from 0 to 90 mol %, based on the total amount of diols (b), have a molecular weight of from 60 to 500 g/mol,
c) monomers distinct from monomers (a) and (b) and comprising at least one isocyanate group or at least one isocyanate-reactive group and moreover bearing at least one hydrophilic group or a potentially hydrophilic group to bring about the water dispersibility of the polyurethanes
d) optional further polyfunctional compounds distinct from monomers (a) to (c) and comprising reactive groups which are alcoholic hydroxyl groups, primary or secondary amino groups or isocyanate groups and
e) optional monofunctional compounds distinct from monomers (a) to (d) and comprising a reactive group which is an alcoholic hydroxyl group, a primary or secondary amino group or an isocyanate group,
said polyurethane being obtainable by reaction of monomers a), b), c) and optionally d) and e) in the presence of a catalyst, for example a tin salt, such as dibutyltin dilaurate (DE-C 198 17 115) or tin-free catalysts, for example based on bismuth neodecanoate The aqueous dispersions according to the invention comprise polyurethanes which in addition to other monomers are derived from diisocyanates a), preference being given to using such diisocyanates a) as are typically employed in polyurethane chemistry. Suitable monomers (a) include in particular diisocyanates of formula X (NCO)2 where X is an aliphatic hydrocarbon radical comprising from 4 to 12 carbon atoms, a cycloaliphatic or aromatic hydrocarbon radical comprising from 6 to 15 carbon atoms or an araliphatic hydrocarbon radical comprising from 7 to 15 carbon atoms. Examples of such diisocyanates include tetramethylene diisocyanate, hexamethylene diisocyanate (HDI), dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, cis/cis and cis/trans isomers and mixtures consisting of these compounds.

Such diisocyanates are commercially available. Mixtures of these isocyanates of particular importance are mixtures of the respective structural isomers of diisocyanatotoluene and diisocyanatodiphenylmethane, the mixture of 80 mol % of 2,4-diisocyanatotoluene and 20 mol % of 2,6-diisocyanatotoluene being particularly suitable.

The mixtures of aromatic isocyanates such as 2,4-diisocyanatotoluene and/or 2,6-diisocyanatotoluene with aliphatic or cycloaliphatic isocyanates such as hexamethylene diisocyanate or IPDI are also particularly advantageous, the preferred mixing ratio of the aliphatic isocyanate to the aromatic isocyanate being from 4:1 to 1:4. In addition to the abovementioned compounds, the synthesis of the polyurethanes may also employ isocyanates bearing further capped isocyanate groups, for example uretdione groups, in addition to the free isocyanate groups. With a view to achieving good film formation and elasticity, suitable diols (b) especially include relatively high molecular weight diols (b1) having a molecular weight of about 500 to 5000 g/mol, preferably about 1000 to 3000 g/mol. The diols (b1) are in particular polyester polyols, which are known from, for example, Ullmanns Enzyklopädie der technischen Chemie, 4th edition, volume 19, pp. 62 to 65. Preference is given to using polyester polyols obtained by reaction of dihydric alcohols with dibasic carboxylic acids. Instead of using free polycarboxylic acids, the polyester polyols may also be prepared using the corresponding polycarboxylic anhydrides or the corresponding polycarboxylic esters of lower alcohols or mixtures thereof.

As sulfonated polyester polyols it is also possible to employ, for example, the compounds disclosed in EP 2 666 800, for example the product "SS55-225-130", a sulfonated polyesterdiol comprising free sodium sulfonate groups, molecular weight 550; Crompton Corp., Middlebury, Conn.

The polycarboxylic acids may be aliphatic, cycloaliphatic, araliphatic, aromatic or heterocyclic and may optionally be substituted, for example by halogen atoms, and/or unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids and dimethylsulfoisophthalic acid. Preference is given to dicarboxylic acids of the general formula HOOC—(CH2)y-COOH where y is a number from 1 to 20, preferably an even number from 2 to 20, for example succinic acid, adipic acid, sebacic acid and dodecanedicarboxylic acid. Suitable polyhydric alcohols include, for example, ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols and also diethylene glycol, triethylene glycol, tetraethylene glycol, polyethylene glycol, dipropylene glycol, polypropylene glycol, dibutylene glycol and polybutylene glycols. Preference is given to alcohols of general formula HO—(CH2)x-OH where x is a number from 1 to 20, preferably an even number from 2 to 20. Examples thereof include ethylene glycol, butane-1,4-diol, hexane-1, 6-diol, octane-1,8-diol and dodecane-1,12-diol. Neopentyl glycol is also preferred.

Also suitable are polycarbonate diols, obtainable, for example, by reaction of phosgene with an excess of the low molecular weight alcohols cited as synthesis components for the polyester polyols. Also suitable are lactone-based polyester diols which are homo- or copolymers of lactones, preferably terminal hydroxyl-functional addition products of lactones onto suitable difunctional starter molecules. Suitable lactones are preferably lactones derived from compounds of general formula HO—(CH2)z-COOH where z is a number from 1 to 20 and one H atom of a methylene unit may also be substituted by a C1 to C4 alkyl radical. Examples include ε-caprolactone, β-propiolactone, γ-butyrolactone and/or methyl-ε-caprolactone and mixtures thereof. Suitable starter components are, for example, the low molecular weight dihydric alcohols cited hereinabove as a synthesis component for the polyester polyols. The corresponding polymers of ε-caprolactone are particularly preferred. Lower polyester diols or polyether diols may also be used as starters to prepare the lactone polymers. Instead of the polymers of lactones, it is also possible to use the corresponding chemically equivalent polycondensates of the hydroxycarboxylic acids corresponding to the lactones.

Suitable monomers (b1) further include polyether diols. Said polyether diols are in particular obtainable by polymerization of ethylene oxide, propylene oxide, butylene oxide, tetrahydrofuran, styrene oxide or epichlorohydrin with itself, for example in the presence of $BF_3$ or by addition of these compounds, optionally mixed or in succession, onto starting components having reactive hydrogen atoms, such as alcohols or amines, for example water, ethylene glycol, propane-1,2-diol, propane-1,3-diol, 1,2-bis(4-hydroxydiphenyl)propane or aniline. Particular preference is given to polytetrahydrofuran having a molecular weight of from 240 to 5000, especially from 500 to 4500. Mixtures of polyester diols and polyether diols may also be used as monomers (b1). Likewise suitable are polyhydroxyolefins, preferably those comprising 2 terminal hydroxyl groups, for example α,ω-dihydroxypolybutadiene, α,ω-dihydroxy polymethacrylic ester or α,ω-dihydroxy polyacrylic ester as monomers (c1). Such compounds are disclosed in EP-A 622 378 for example. Further suitable polyols are polyacetals, polysiloxanes and alkyd resins.

The polyols may also be employed as mixtures in a ratio of from 0.1:1 to 1:9.

The hardness and the modulus of elasticity of the polyurethanes may be increased by employing as diols (b) not only diols (b1) but also low molecular weight diols (b2) having a molecular weight of about 60 to 500 g/mol, preferably of 62 to 200 g/mol.

Monomers (b2) employed are especially the synthesis components of the short-chain alkanediols cited for preparing polyester polyols, preference being given to diols comprising from 2 to 12 carbon atoms, unbranched diols comprising from 2 to 12 carbon atoms and an even number of carbon atoms and also pentane-1,5-diol and neopentyl glycol.

It is preferable when the proportion of diols (b1), based on the total amount of diols (b), is from 10 to 100 mol % and the proportion of monomers (b2), based on the total amount of diols (b), is from 0 to 90 mol %. It is more preferable when the ratio of diols (b1) to monomers (b2) is from 0.1:1 to 5:1, more preferably from 0.2:1 to 2:1.

In order to ensure that the polyurethanes are water-dispersible, the polyurethanes are synthesized not only from components (a), (b) and optionally (d) but also from monomers (c) which are distinct from components (a), (b) and (d) and which bear at least one isocyanate group or at least one isocyanate-reactive group and moreover bear at least one hydrophilic group or a group which can be converted into a hydrophilic group.

Hereinbelow, the term "hydrophilic groups or potentially hydrophilic groups" is abbreviated to "(potentially) hydrophilic groups". The (potentially) hydrophilic groups react with isocyanates substantially more slowly than the functional groups of the monomers used to synthesize the polymer main chain.

The proportion of components comprising (potentially) hydrophilic groups in the total amount of components (a), (b), (c), (d) and (e) is generally measured such that the molar amount of the (potentially) hydrophilic groups based on the amount by weight of all monomers (a) to (e) is from 30 to 1000, preferably from 50 to 500 and more preferably from 80 to 300 mmol/kg.

The (potentially) hydrophilic groups may be nonionic or preferably (potentially) ionic hydrophilic groups. Suitable nonionic hydrophilic groups include in particular polyethylene glycol ethers composed of preferably from 5 to 150 and preferably from 40 to 120 ethylene oxide repeating units. The content of polyethylene oxide units is generally from 0.1 to 15 and preferably from 1 to 10 wt % based on the amount by weight of all monomers (a) to (e).

Preferred monomers comprising nonionic hydrophilic groups are polyethylene oxide diols, polyethylene oxide monools and the reaction products of a polyethylene glycol and a diisocyanate which bear a terminally etherified polyethylene glycol radical. Such diisocyanates and processes for the preparation thereof are described in patent specifications U.S. Pat. Nos. 3,905,929 and 3,920,598.

Ionic hydrophilic groups are especially anionic groups such as sulfonate, carboxylate and phosphate groups in the form of the alkali metal or ammonium salts thereof and also cationic groups such as ammonium groups, in particular protonated tertiary amino or quaternary ammonium groups.

Potentially ionic hydrophilic groups are especially those which may be converted into the abovementioned ionic hydrophilic groups by simple neutralization, hydrolysis or quaternization reactions, i.e., carboxylic acid groups or tertiary amino groups for example.

(Potentially) ionic monomers (c) are described at length, for example, in Ullmanns Enzyklopädie der technischen Chemie, 4th edition, volume 19, pp. 311-313 and, for example, in DE-A 14 95 745.

(Potentially) cationic monomers (c) of particular practical importance are especially monomers comprising tertiary amino groups, for example: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, the alkyl radicals and alkanediyl units of these tertiary amines consisting independently of from 1 to 6 carbon atoms. Also suitable are polyethers comprising tertiary nitrogen atoms and preferably two terminal hydroxyl groups, as obtainable in a conventional manner, for example, by alkoxylation of amines comprising two hydrogen atoms attached to amine nitrogen, for example methylamine, aniline or N,N'-dimethylhydrazine. Such polyethers generally have a molar weight of between 500 and 6000 g/mol.

These tertiary amines are converted into the ammonium salts either with acids, preferably strong mineral acids such as phosphoric acid, sulfuric acid, hydrohalic acids or strong organic acids,
or by reaction with suitable quaternizing agents such as C1 to C6 alkyl halides or benzyl halides, for example bromides or chlorides.

Suitable monomers comprising (potentially) anionic groups typically include aliphatic, cycloaliphatic, araliphatic or aromatic carboxylic acids and sulfonic acids bearing at least one alcoholic hydroxyl group or at least one primary or secondary amino group. Preference is given to dihydroxyalkylcarboxylic acids, especially comprising from 3 to 10 carbon atoms, as also described in U.S. Pat. No. 3,412,054. Particular preference is given to compounds of general formula (c1)

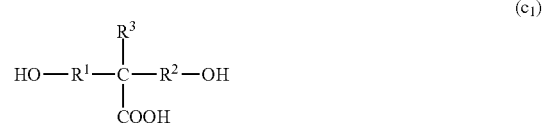

where $R^1$ and $R^2$ represent a C1 to C4 alkanediyl unit and $R^3$ represents a C1 to C4 alkyl unit, dimethylolpropionic acid (DMPA) being especially preferred. Also suitable are corresponding dihydroxysulfonic acids and dihydroxyphosphonic acids such as 2,3-dihydroxypropanephosphonic acid.

Otherwise suitable are dihydroxy compounds having a molecular weight greater than from 500 to 10 000 g/mol and comprising at least 2 carboxylate groups, which are disclosed in DE-A 39 11 827. Said compounds are obtainable by reaction of dihydroxy compounds with tetracarboxylic dianhydrides such as pyromellitic dianhydride or cyclopentanetetracarboxylic dianhydride in a molar ratio of from 2:1 to 1.05:1 in a polyaddition reaction. Suitable dihydroxy compounds are in particular the monomers (b2) cited as chain extenders and diols (b1).

Suitable monomers (c) comprising isocyanate-reactive amino groups are aminocarboxylic acids such as lysine, β-alanine or the adducts, cited in DE-A 20 34 479, of aliphatic diprimary diamines onto α,β-unsaturated carboxylic or sulfonic acids.

Such compounds conform, for example, to formula (c2)

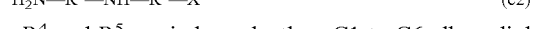

where $R^4$ and $R^5$ are independently a C1 to C6 alkanediyl unit, preferably ethylene, and X is —COOH or —SO$_3$H.

Particularly preferred compounds of formula (c2) are N-(2-aminoethyl)-2-aminoethanecarboxylic acid and N-(2-aminoethyl)-2-aminoethanesulfonic acid and the corresponding alkali metal salts, sodium being particularly preferred as counterion. Also preferred are the adducts of the abovementioned aliphatic diprimary diamines onto 2-acrylamido-2-methylpropanesulfonic acid as are described in DE patent specification 19 54 090 for example. Further suitable aminosulfonic acids are, for example, sodium 2-((2-aminoethyl)amino)ethanesulfonate, diaminoalkylsulfonic acid and the salts thereof, for example ethylenediamino-β-ethylsulfonic acid, ethylenediaminopropylsulfonic or ethylenediaminobutylsulfonic acid, 1,2- or 1,3-propylenediamino-β-ethylsulfonic acid.

Provided that monomers comprising potentially ionic groups are employed, the conversion thereof into the ionic form may be effected before, during but preferably after the isocyanate polyaddition since the ionic monomers are often only sparingly soluble in the reaction mixture. It is particularly preferable when the sulfonate or carboxylate groups are present as salts comprising an alkali metal ion or an ammonium ion as counterion.

The monomers (d) which are distinct from monomers (a) to (c) and which are optionally also constituents of the polyurethane generally serve to crosslink or to chain-extend. They are generally more than dihydric nonphenolic alcohols, amines comprising 2 or more primary and/or secondary amino groups and compounds bearing one or more primary and/or secondary amino groups in addition to one or more alcoholic hydroxyl groups.

Alcohols having a hydricity greater than 2 and which may be used to establish a certain degree of branching or crosslinking are, for example, trimethylolpropane, glycerol and sugar.

Also suitable are monoalcohols which, in addition to the hydroxyl group, bear a further isocyanate-reactive group such as monoalcohols comprising one or more primary and/or secondary amino groups, e.g. monoethanolamine. Polyamines comprising 2 or more primary and/or secondary amino groups are especially employed when the chain-extending or as the case may be crosslinking is to take place in the presence of water since amines generally react with isocyanates more rapidly than alcohols or water.

This is often necessary when aqueous dispersions of crosslinked polyurethanes or polyurethanes of high molecular weight are desired. The procedure in such cases comprises preparing prepolymers comprising isocyanate groups, rapidly dispersing said prepolymers in water and subsequently chain-extending or crosslinking said prepolymers by adding compounds comprising a plurality of isocyanate-reactive amino groups.

Amines suitable therefor are generally polyfunctional amines having molar weights in the range of from 32 to 500 g/mol, preferably from 60 to 300 g/mol, and comprising at least two amino groups selected from the group of primary and secondary amino groups. Examples thereof include diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines may also be employed in blocked form, for example in the form of the corresponding ketimines (see, for example, CA-A 1 129 128), ketazines (cf., for example, U.S. Pat. No. 4,269,748) or amine salts (see U.S. Pat. No. 4,292,226). Oxazolidines too, as employed in U.S. Pat. No. 4,192,937 for example, are capped polyamines which may be used for chain-extending the prepolymers when preparing the polyurethanes according to the invention. Use of such capped polyamines generally comprises mixing said polyamines with the prepolymers in the absence of water and subsequently mixing this mixture with the dispersing water or a portion of the dispersing water, thus releasing the corresponding polyamines hydrolytically. Preference is given to using mixtures of di- and triamines, mixtures of isophoronediamine (IPDA) and diethylenetriamine (DETA) being particularly preferred.

The polyurethanes preferably comprise from 1 to 30 and more preferably from 4 to 25 mol %, based on the total amount of components (b) and (d), of a polyamine comprising at least 2 isocyanate-reactive amino groups as monomers (d). Alcohols having a hydricity greater than 2 and which may be used to establish a certain degree of branching or crosslinking are, for example, trimethylolpropane, glycerol and sugar. Monomers (d) higher than difunctional isocyanates may also be used for the same purpose. Commercially available compounds are, for example, the isocyanurate or the biuret of hexamethylene diisocyanate.

Monomers (e) which are optionally co-used are monoisocyanates, monoalcohols and monoprimary and -secondary amines. The proportion thereof is generally no more than 10 mol % based on the total molar amount of the monomers. These monofunctional compounds typically bear further functional groups such as olefinic groups or carbonyl groups and serve to introduce functional groups into the polyurethane which render possible the dispersal or crosslinking or further polymer-analogous reaction of the polyurethane. Suitable for this purpose are monomers such as isopropenyl-α,α-dimethylbenzyl isocyanate (TMI) and esters of acrylic or methacrylic acid such as hydroxyethyl acrylate, hydroxyethyl methacrylate, hydroxypropyl acrylate and hydroxypropyl methacrylate.

Coatings having a particularly good profile of properties are obtained especially when the monomers (a) employed are substantially only aliphatic diisocyanates, cycloaliphatic diisocyanates or TMXDI and the monomers (b1) employed are substantially only polyester diols synthesized from the cited aliphatic diols and diacids. This combination of monomers is superbly complemented, as component (c), by diamino acid salts; very particularly by N-(2-aminoethyl)-2-aminoethanesulfonic acid, N-(2-aminoethyl)-2-aminoethanecarboxylic acid or the corresponding alkali metal salts thereof, of which the sodium salts are most suitable, and a mixture of DETA/IPDA as component (d). The way in which the molecular weight of the polyurethanes may be adjusted through choice of the proportions of the mutually reactive monomers and of the arithmetic mean of the number of reactive functional groups per molecule is common general knowledge in the field of polyurethane chemistry.

Normally, components (a) to (e) and also their respective molar quantities are chosen such that the ratio A:B, where A) is the molar amount of isocyanate groups and B) is the sum total of the molar amount of hydroxyl groups and the molar amount of functional groups capable of reacting with isocyanates in an addition reaction, is from 0.5:1 to 2:1, preferably from 0.8:1 to 1.5 and more preferably from 0.9:1 to 1.2:1. It is very particularly preferable when the ratio A:B is very close to 1:1.

The monomers (a) to (e) employed bear on average typically from 1.5 to 2.5, preferably from 1.9 to 2.1 and more preferably 2.0 isocyanate groups or functional groups capable of reacting with isocyanates in an addition reaction. The polyaddition of components (a) to (e) to prepare the polyurethane present in the aqueous dispersions according to the invention may be effected at reaction temperatures of from 20° C. to 180° C., preferably from 70° C. to 150° C., at atmospheric pressure or at autogenous pressure.

The reaction times required are typically in the range of from 1 to 20 hours, particularly in the range of from 1.5 to 10 hours. In the field of polyurethane chemistry it is known how the reaction time is affected by a multitude of parameters such as temperature, concentration of the monomers, reactivity of the monomers. The polyaddition of monomers a), b), c) and optionally d) and e) to prepare the PU dispersion according to the invention is effected in the presence of a catalyst.

In the field of polyurethane chemistry it is known how the reaction time is affected by a multitude of parameters such as temperature, concentration of the monomers, reactivity of the monomers.

Typical catalysts may be co-used to increase the rate of reaction of the diisocyanates. Catalysts suitable for this purpose include in principle all catalysts typically employed in polyurethane chemistry. These are, for example, organic amines, particularly tertiary aliphatic, cycloaliphatic or aromatic amines and/or Lewis-acidic organic metal compounds. Suitable Lewis-acidic organic metal compounds include, for example, tin compounds, such as, for example, tin(II) salts of organic carboxylic acids, for example tin(II) acetate, tin(II) octoate, tin(II) ethylhexanoate and tin(II) laurate and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Metal complexes, such as acetylacetonates of iron, titanium, aluminum, zirconium, manganese, nickel and cobalt are also possible. Further metal catalysts are described by Blank et al. in Progress in Organic Coatings, 1999, vol. 35, pages 19-29.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl-3,5-heptanedionate.

Bismuth and cobalt catalysts and cesium salts may also be employed as catalysts. Suitable cesium salts include compounds employing the following anions: F—, Cl—, ClO—, ClO3-, ClO4-, Br—, I—, IO3-, CN—, OCN—, NO2-, NO3-, HCO3-, $CO_3^{2-}$, S2-, SH—, HSO3-, $SO_3^{2-}$, HSO4-, $SO_4^{2-}$, $S_2O_2^{2-}$, $S_2O_4^{2-}$, S2Os2-, $S_2O_5^{2-}$, S2O12-, S2Oa2-, H2PO2-, H2PO4-, $HPO_4^{2-}$, $PO_4^{3-}$, P2014-, (OCnH2n+1)-, (CnH2n-1O2)-, (CnH2n-3O2)- and (Cn+1H2n-2O4) where n is from 1 to 20.

Of these, preference is given to cesium carboxylates in which the anion conforms to the formulae (CnH2n-1O2)- and (Cn+1H2n-2O4)2- where n is from 1 to 20. Particularly preferred cesium salts comprise monocarboxylates of general formula (CnH2n-1O2)- as anions where n is from 1 to 20. Formate, acetate, propionate, hexanoate and 2-ethylhexanoate must be mentioned in particular here.

Suitable polymerization apparatuses include stirred-tank reactors, particularly when co-use of solvents ensures low viscosity and effective heat removal.

When the reaction is carried out without solvent, the generally high viscosities and the generally only short reaction times mean that extruders, in particular self-cleaning multiscrew extruders, are particularly suitable.

The process known as the "prepolymer mixing process" comprises initially preparing a prepolymer bearing isocyanate groups. Here, the components (a) to (d) are chosen such that the defined ratio A:B is greater than from 1.0 to 3, preferably from 1.05 to 1.5. The prepolymer is first dispersed in water and simultaneously and/or subsequently crosslinked by reaction of the isocyanate groups with amines bearing more than 2 isocyanate-reactive amino groups or chain-extended with amines bearing 2 isocyanate-reactive amino groups. Chain extension also occurs when no amine is added. In this case, isocyanate groups are hydrolyzed to give amine groups which react with any remaining isocyanate groups of the prepolymers to effect chain extension.

The mean particle size (z-average), measured by dynamic light scattering using a Malvern® Autosizer 2 C, of the polyurethane dispersions thus prepared does not constitute an essential feature of the invention and is generally <1000 nm, preferably <500 nm, more preferably <200 nm and most preferably between 20 and less than 200 nm.

The polyurethane dispersions generally have a solids content of from 10 to 75 wt %, preferably from 20 to 65 wt %, and a viscosity of from 10 to 500 mPas (ICI cone and plate viscometer with measuring head C in accordance with ASTM D4287), measured at a temperature of 20° C. and a shear rate of 250 s-1).

Preferred solvents are infinitely miscible with water, have a boiling point of from 40° C. to 100° C. at atmospheric pressure and react only slowly with the monomers, if at all.

The dispersions are generally prepared by one of the following processes: In the "acetone process", an ionic polyurethane is prepared from components (a) to (c) in a water-miscible solvent which boils at below 100° C. at atmospheric pressure. Sufficient water is then added to form a dispersion in which water represents the coherent phase. The "prepolymer mixing process" differs from the acetone process in that a prepolymer which bears isocyanate groups is initially prepared instead of a fully reacted (potentially) ionic polyurethane. Here, the components are chosen such that the defined ratio A:B is greater than from 1.0 to 3, preferably from 1.05 to 1.5. The prepolymer is first dispersed in water and subsequently optionally crosslinked by reaction of the isocyanate groups with amines bearing more than 2 isocyanate-reactive amino groups or chain-extended with amines bearing 2 isocyanate-reactive amino groups. Chain extension also occurs when no amine is added. In this case, isocyanate groups are hydrolyzed to amino groups which react with any remaining isocyanate groups of the prepolymers to effect chain extension. When the preparation of the polyurethane has comprised co-use of a solvent, the majority of the solvent is typically removed from the dispersion, for example by distillation under reduced pressure. The dispersions preferably have a solvent content of less than 10 wt % and are more preferably solvent-free. The dispersions generally have a solids content of from 10 to 75 wt %, preferably from 20 to 65 wt %, and a viscosity of from 10 to 500 mPas (measured at a temperature of 20° C. and a shear velocity of 250 s-1).

Aqueous acrylate dispersions have become standard binders for architectural coatings and roof coatings, for example as repair coatings. They provide stable, long-life, water and weather resistant decorative coatings, generally on inorganic building materials but also on wood, old coatings and substrates or metal surfaces. When flat roofs are first installed or when they are being repaired, rolls of pre-prepared materials, for example bituminized fibrous materials or nonwoven fabrics, such as EPDM rubber or thermoplastic elastomers for example, are processed to protect them. An alternative possibility is the use of two-component liquid polymer preparations, for example epoxy resins or polyurethanes, which may be applied by rolling or spraying. A feature of these materials is that they are highly elastic and highly aging resistant.

Horizontal roof surfaces may also be coated using dispersion-bound paints similar to the paints of exterior coatings. However, these paints should likewise be particularly elastic in order that they do not fail prematurely in the event of substrate damage (cracks, etc.) to allow ingress of rainwater into the building. These paints also need to be particularly weather and UV resistant. Dispersion-bound paints for horizontal roof coating are thus subject to increased demands which may differ from typical dispersion binders. Dispersion binders for horizontal roof coating are not generally described separately and consideration of the prior art thus entails recourse to architectural coating binders.

Water-based polymer dispersions as binders for architectural coatings and renders are typically prepared from a principal monomer having a high glass transition temperature (hard monomer) and a principal monomer having a low glass transition temperature (soft monomer). The hard monomers selected are generally styrene or methyl methacrylate and the soft monomer selected is generally n-butyl acrylate or else 2-ethylhexyl acrylate. Architectural coating binders are thus described as styrene acrylates or, when methyl methacrylate is used as the hard monomer, as straight acrylates. Most binders for filled paints consist of styrene/n-butyl acrylate or of methyl methacrylate/n-butyl acrylate for reasons of good outdoor weathering resistance. The particular amounts of hard and soft monomer are selected depending on the application according to the glass transition temperature required for the particular use. Binders for solvent-free architectural coatings generally have a glass transition temperature in the range of 0-5° C., low-solvent architectural coatings in the range of 5-20° C. and solvent-containing architectural coatings in the range of from 20° C. to 40° C.

Such prior art binders are described in EP 771 328 for example, for instance in Examples A, J and K.

WO2013/073145 describes aqueous polymer dispersions, which comprise (a) at least two monomers M1 having a glass transition temperature of ≥25° C., (b) at least two monomers M2 having a glass transition temperature of <25° C. and further monomers M3, as binders in coating materials having particularly good color retention. However, the application gives no indication of the elasticity of the paints according to the invention.

DE 10 161 156 describes a water-based polyurethane dispersion as may also be used as the first stage for a PU-acrylate hybrid dispersion.

By purposive variation of monomer type and quantity, those skilled in the art are able according to the invention to prepare aqueous polymeric compositions whose polymers have a glass transition temperature in the desired range. Orientation is possible by means of the Fox equation. According to Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980) the glass transition temperature of copolymers is given to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees kelvin of the polymers synthesized from only one of the monomers 1, 2, ... n at a time. The $T_g$ values for the homopolymers of most monomers are known and listed, for example, in Ullmann's Encyclopedia of Industrial Chemistry, vol. 5, Vol. A21, page 169, VCH Weinheim, 1992; further sources for glass transition temperatures of homopolymers are, for example, J. Brandrup, E. H. Immergut, Polymer Handbook, $1^{st}$ ed., J. Wiley, New York 1966, $2^{nd}$ ed. J. Wiley, New York 1975, and $3^{rd}$ ed. J. Wiley, New York 1989. A value of –13° C. is used for ethyl acrylate.

The actual glass transition temperature may be determined by differential scanning calorimetry (ASTM D 3418-08, midpoint temperature).

Architectural coatings and roof coatings preferably employ pure acrylate dispersions comprising methyl methacrylate and n-butyl acrylate as principal monomers because these exhibit particularly good UV and weathering resistance. However, experience has shown that it is not possible to prepare particularly elastic coating materials using these monomers alone. The further use of acrylonitrile does make this possible, though weathering of paints comprising these binders often gives rise to undesired yellowing. Architectural coatings and roof coatings based on dispersion binders comprising the principal monomers styrene and n-butyl acrylate are less UV and weather resistant but can be sufficient when paints having a high filler content, i.e., paints having a low binder content, are employed. However, it is not known that this monomer combination can be used to prepare coating materials having a particularly high breaking strength and breaking elongation.

The polyurethane-polyacrylate hybrid dispersions according to the invention, obtainable by radical polymerization of at least one acrylate polymer A1 in the presence of at least one polyurethane (P1) and at least one initiator system, wherein the at least one polyurethane (P1) has a polyalkylene oxide content of at least 10 g/kg of polyurethane and a sulfonated raw material content of at least 25 mmol per kg of polyurethane and the acrylate polymer has a glass transition temperature of from 50° C. to 50° C. and the mass fraction of the polyurethane is at least 5% and no more than 99.99% based on the overall hybrid polymer, render possible the preparation of coating materials having a high breaking strength and breaking elongation.

The composition of the acrylate dispersion A1 comprises for high elasticity, i.e. for high breaking strength/breaking elongation, principal monomer combinations such as styrene/2-ethylhexyl acrylate, from styrene/n-butyl acrylate or from methyl methacrylate/n-butyl acrylate or preferably (a) at least two monomers M1 having a glass transition temperature of ≥25° C. and (b) at least two monomers M2 having a glass transition temperature of <25° C. and optionally further monomers M3 which show distinctly better breaking strength and breaking elongation in the coating materials according to the invention, in particular in architectural coatings and roof coatings than comparable prior art binders.

It is preferably also possible to employ the monomer combinations cyclohexyl methacrylate/n-butyl acrylate and the 3-component combinations styrene/methyl methacrylate/n-butyl acrylate, styrene/methyl methacrylate/2-ethylhexyl acrylate, styrene/cyclohexyl methacrylate/n-butyl acrylate, styrene/cyclohexyl methacrylate/2-ethylhexyl acrylate, methyl methacrylate/n-butyl acrylate/2-ethylhexyl acrylate, cyclohexyl methacrylate/methyl methacrylate/n-butyl acrylate, cyclohexyl methacrylate/methyl methacrylate/2-ethylhexyl acrylate and cyclohexyl methacrylate/n-butyl acrylate/2-ethylhexyl acrylate.

The UV and weathering resistance is also very good and comparable to the methyl methacrylate/n-butyl acrylate binders despite the additional use of monomers in fact known as more unstable. Light-colored or white, filled architectural coatings and renders show no significant deficits in weathering tests when styrene is co-used in acrylates.

In accordance with the invention, the following monomers may be employed for the polymerization of the acrylate polymers A1:

Examples of monomers M1 having a glass transition temperature of 25° C. include vinylaromatic compounds, such as vinyltoluene, alpha- and para-methylstyrene, alpha-butylstyrene, 4-n-butylstyrene and preferably styrene, C1 to C4 alkyl methacrylates, namely MMA, ethyl methacrylate, n-propyl methacrylate, i-propyl methacrylate, n-butyl methacrylate, t-butyl acrylate, i-butyl methacrylate, t-butyl methacrylate, t-butyl acrylate, cyclohexyl methacrylate, stearyl acrylate, vinyl acetate and/or ethylenically unsaturated nitriles. Examples of nitriles include acrylonitrile and methacrylonitrile. Vinyl halides are ethylenically unsaturated compounds substituted with chlorine, fluorine or bromine, preferably vinyl chloride and vinylidene chloride.

Suitable monomers M2 having a glass transition temperature of <25° C. are, for example, C1 to C20 alkyl acrylates, such as methyl acrylate, ethyl acrylate, n- and i-propyl acrylate, n-, i- and sec-butyl acrylate, n- and i-pentyl acrylate, n-hexyl acrylate, 2-ethylhexyl acrylate, heptyl acrylate, octyl acrylate, C10 isoamyl guerbet acrylate, 2-propylpentyl acrylate, 1-propylheptyl acrylate, lauryl acrylate, C5 to C20 alkyl methacrylates such as n- and isopentyl methacrylate, n-hexyl methacrylate, heptyl methacrylate, octyl methacrylate, C10 isoamyl guerbet methacrylate, 2-propylpentyl methacrylate, 2-propylheptyl methacrylate, lauryl methacrylate, vinyl esters of unbranched or branched carboxylic acids comprising from 2 to 11 carbon atoms, such as vinyl propionate, vinyl butyrate, 1-methylvinyl acetate, vinyl pivalate and vinyl esters of α-branched monocarboxylic acids comprising 9 carbon atoms (VeoVa9R, trade name of Shell), such as vinyl 2-ethylhexanoate, vinyl laurate, vinyl esters of α-branched monocarboxylic acids comprising 10 or 11 carbon atoms (VeoVa10®, VeoVa11®, trade name of Shell), and vinyl esters of branched monocarboxylic acids comprising from 10 to 13 carbon atoms (Exxar Neo12), C1-C20 vinyl ethers, such as methyl vinyl ether, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether etc., butadiene, vinylidene chloride and butanediol monoacrylate.

Preference is given to using the monomer M2 pair n-butyl acrylate/ethylhexyl acrylate.

Moreover, small amounts of monomers M3 may optionally be employed, for example less than 10 wt %, preferably less than 8 wt % and more preferably less than 6 wt % thereof.

Examples of these further monomers M3 include ethylenically unsaturated mono- and dicarboxylic acids, such as acrylic acid, methacrylic acid, itaconic acid, fumaric acid and maleic acid, aconitic acid, mesaconic acid, crotonic acid, citraconic acid, acryloxypropionic acid, methacryloxypropionic acid, vinylacetic acid, monomethyl itaconate, monomethyl fumarate,
monobutyl fumarate, acrylic anhydride, methacrylic anhydride, maleic anhydride and itaconic anhydride,
acrylamidoglycolic acid and methacrylamidoglycolic acid, acrylamide, methacrylamide and isopropylacrylamide, substituted (meth)acrylamides, for example N,N-dimethylamino (meth)acrylate; 3-dimethylamino-2,2-dimethylprop-1-yl (meth)acrylate, N-dimethylaminomethyl(meth)acrylamide,
N-(4-morpholinomethyl)(meth)acrylamides, diacetoneacrylamide; acetoacetoxyethyl methacrylate;
N-methylol(meth)acrylamide, polyethylene oxide (meth)acrylate, methoxypolyethylene oxide (meth)acrylate, acrolein, methacrolein; N-(2-methacryloxyethyl)ethyleneurea, 1-(2-(3-allyloxy-2-hydroxypropylamino)ethyl)imidazolidin-2-one, ureido (meth)acrylate, 2-ethyleneureidoethyl methacrylate.

Also suitable are: ethylenically unsaturated, hydroxyalkyl-functional comonomers, such as hydroxyalkyl esters of acrylic and methacrylic acid comprising a $C_1$ to $C_5$ alkyl radical such as hydroxyethyl, hydroxypropyl or hydroxybutyl acrylate or methacrylate; hydroxyethyl (meth)acrylate and hydroxypropyl (meth)acrylate; 4-hydroxybutyl acrylate, 4-hydroxybutyl methacrylate, glycidyl (meth)acrylate and N-vinylpyrrolidone, vinylimidazole.

Particular preference is given to using acrylic acid, methacrylic acid, acrylamide, hydroxyethyl (meth)acrylate and hydroxypropyl (meth)acrylate.

Further examples of monomers M3 include phosphorus-containing monomers, for example vinylphosphonic acid and allylphosphonic acid. Also suitable are the mono- and diesters of phosphonic acid and phosphoric acid with hydroxyalkyl (meth)acrylates, specifically the monoesters. Also suitable are the diesters of phosphonic acid and phosphoric acid monoesterified with a hydroxyalkyl (meth)acrylate and further monoesterified with an alcohol distinct therefrom, for example an alkanol. Suitable hydroxyalkyl (meth)acrylates for these esters are those mentioned hereinbelow as separate monomers, in particular 2-hydroxyethyl (meth)acrylate, 3-hydroxypropyl (meth)acrylate, 4-hydroxybutyl (meth)acrylate etc. Corresponding dihydrogen phosphate ester monomers comprise phosphoalkyl (meth)acrylates, such as 2-phosphoethyl (meth)acrylate, 2-phosphopropyl (meth)acrylate, 3-phosphopropyl (meth)acrylate, phosphobutyl (meth)acrylate and 3-phospho-2-hydroxypropyl (meth)acrylate. Also suitable are the esters of phosphonic acid and phosphoric acid with alkoxylated hydroxyalkyl (meth)acrylates, for example the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$ where n is from 1 to 50. Additionally suitable are phosphoalkyl crotonates, phosphoalkyl maleates, phosphoalkyl fumarates, phosphodialkyl (meth)acrylates, phosphodialkyl crotonates and allyl phosphates. Further suitable monomers comprising phosphorus groups are described in WO 99/25780 and U.S. Pat. No. 4,733,005, hereby incorporated by reference.

Additionally suitable are vinylsulfonic acid, allylsulfonic acid, sulfoethyl acrylate, sulfoethyl methacrylate, sulfopropyl acrylate, sulfopropyl methacrylate, 2-hydroxy-3-acryloxypropylsulfonic acid, 2-hydroxy-3-methacryloxypropylsulfonic acid, styrenesulfonic acids and 2-acrylamido-2-methylpropanesulfonic acid. Suitable styrenesulfonic acids and derivatives thereof are styrene-4-sulfonic acid and styrene-3-sulfonic acid and the alkaline earth metal or alkali metal salts thereof, for example sodium styrene-3-sulfonate and sodium styrene-4-sulfonate, poly(allyl glycidyl ethers) and mixtures thereof, in the form of various products bearing the name Bisomer® from Laporte Performance Chemicals, UK. These include, for example, Bisomer® MPEG 350 MA, a methoxypolyethylene glycol monomethacrylate.

The functional groups of the monomers play a part in imparting the colloidal stabilization of the composition, particularly when the formulation as a whole also comprises fillers, for example calcium carbonate or others. Crosslinking here takes place either by reaction with one another or by addition of a further crosslinking agent. Crosslinking preferably takes place only after actual film formation.

Monomers which typically increase the internal strength of films of aqueous polymer dispersions normally comprise at least one epoxy, hydroxyl, N-methylol or carbonyl group, or at least two nonconjugated ethylenically unsaturated double bonds. Examples of these include N-alkylolamides of α,β-monoethylenically unsaturated carboxylic acids comprising from 3 to 10 carbon atoms and the esters thereof with alkanols comprising from 1 to 4 carbon atoms, among which particular preference is given to N-methylolacrylamide and N-methylolmethacrylamide, monomers comprising two vinyl radicals, monomers comprising two vinylidene radicals and monomers comprising two alkenyl radicals. Particularly advantageous here are the diesters of dihydric alcohols with α,β-monoethylenically unsaturated monocarboxylic acids, among which preference is given to acrylic acid and methacrylic acid. Examples of such two nonconjugated ethylenically unsaturated monomers comprising double bonds include alkylene glycol diacrylates and dimethacrylates such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate.

Functional crosslinker groups are, for example, keto groups, aldehyde groups and/or acetoacetoxy carbonyl groups, and the formulated crosslinking agents added subsequently may comprise a polyamine or polyhydrazide such as adipic dihydrazide (ADDH), oxalic dihydrazide, phthalic dihydrazide, terephthalic dihydrazide, isophoronediamine and 4,7-dioxadecane-1,1-O-diamine or a crosslinking agent bearing semicarbazide or hydrazine-functional groups. Alternatively, the polymer could bear hydrazide-functional groups and the subsequently formulated crosslinking agent could comprise keto-functional groups.

The functional groups may also be carboxyl functions and the subsequently formulated crosslinking agent could comprise aziridine-, epoxide- or carbodiimide functional groups or the functional groups may be silane-functional groups and the subsequently formulated crosslinking agent may likewise comprise silane-functional groups.

The functional groups may also be ureido groups and the subsequently added crosslinking agent may be a polyaldehyde, for example an α,ω-dialdehyde comprising from one to ten carbon atoms, such as glyoxal, glutardialdehyde or malondialdehyde or the acetals and hemiacetals thereof. See EP 0789724.

Crosslinking here takes place either by reaction with one another or by addition of a further crosslinking agent. Crosslinking preferably takes place only after actual film formation.

It is important here not to use too much additional crosslinking agent, since this may lead to residues of residual crosslinking agent. Too little crosslinking agent, on the other hand, may lead to a soluble coating. It is important here not to use too much additional crosslinking agent, since this may lead to residues of residual crosslinking agent.

It will be appreciated that combinations of the various functional groups and crosslinking mechanisms are also possible.

Vinyl monomers comprising crosslinking groups are, for example, allyl, glycidyl or acetoacetoxy esters, acetoacetoxyamides, keto- and aldehyde-functional vinyl monomers, keto-containing amides such as diacetoneacrylamide or silane (meth)acrylic monomers.

Preferred vinyl monomers bearing crosslinking groups are acetoacetoxyethyl methacrylate (AAEM), diacetoneacrylamide (DAAM) and (meth)acrylic silane monomers; DAAM is most preferred.

Preferred crosslinking mechanisms comprise crosslinking of silane-functional groups and crosslinking of keto-functional groups with hydrazide-functional groups.

Most preferred is the combination of DAAM and ADDH crosslinking.

The weight ratio of the monomers M1 to M2 to M3 depends on the preferred applications of the binder and is thus determined essentially via the glass transition temperature of the polymers prepared from the mixture of all monomers.

Examples of preferred mixtures for architectural coatings and roof coatings include:

a) very soft elastic binder fractions in the hybrid (Tg of about from −40° C. to −20° C.): from 10% to 20% of monomers M1 (calculated based on methyl methacrylate/styrene), 70-88% of monomers M2 and from 0.1% to 10% of monomers M3 (calculated on n-butyl acrylate/2-ethylhexyl acrylate), wherein the amount of styrene in the case of monomers M1 is in the range of 5-10%.

b) soft, self-filming elastic binder fractions in the hybrid (Tg of about 0° C.): from 35% to 50% of monomers M1 (calculated based on methyl methacrylate/styrene), 49-59% of monomers M2 and from 0.1% to 10% of monomers M3 (calculated on n-butyl acrylate/2-ethylhexyl acrylate), wherein the amount of styrene in the case of monomers M1 is in the range of 10-20%.

c) binder fractions for elastic roof coatings and for architectural coatings and renders optionally requiring small proportions of film-forming assistants (Tg of about 15-20° C.): from 37% to 47% of monomers M1 (calculated based on methyl methacrylate/styrene), 48-58% of monomers M2 and from 0.1% to 10% of monomers M3 (calculated on n-butyl acrylate/2-ethylhexyl acrylate), wherein the amount of styrene in the case of monomers M1 is in the range of 10-25%.

d) binder fractions for flexible roof coatings and for architectural coatings and renders requiring relatively large proportions of film-forming assistants (Tg of about 30-40° C.): from 60% to 70% of monomers M1 (calculated based on methyl methacrylate/styrene), 24-34% of monomers M2 and from 0.1% to 10% of monomers M3 (calculated on n-butyl acrylate/2-ethylhexyl acrylate), the amount of styrene in the case of monomers M1 being in the range of 10-25%.

Further preferred combinations can be easily self-determined on the basis of the listing above, for glass transition temperatures which have not been specified.

Preferred monomer combinations M1 are the pairs styrene/methyl methacrylate or cyclohexyl methacrylate/methyl methacrylate and for the monomer combinations M2, the pair n-butyl acrylate/ethylhexyl acrylate. Of the monomers M1 between 0 and 20 wt %, based on the total amount of the monomers M1, M2 and M3, of acrylonitrile and/or methacrylonitrile may be employed.

For ecological reasons, filming of the hybrid binder at temperatures in the range of from 0° C. to 40° C. is sought, so that only small amounts, if any, of a film-forming assistant are required. In accordance with the invention, preference is therefore given to hybrid binders having a minimum film-forming temperature of from −40° C. to +40° C. (calculated). Particular preference is given to hybrid binders having a minimum film-forming temperature of from −40° C. to 20° C. (calculated).

The polyurethane-polyacrylate hybrid dispersions are obtained by radical polymerization of an acrylate polymer A1 in the presence of at least one polyurethane (P1) and at least one initiator system, wherein the at least one polyurethane (P1) has a polyalkylene oxide content of at least 10 g/kg of polyurethane and a content of a sulfonated raw material of at least 25 mmol per kg of polyurethane and the acrylate polymer has a glass transition temperature of from at least −50° C. to 50° C. and the mass fraction of the polyurethane is at least 5% and no more than 99.99% based on the overall hybrid polymer.

In the preparation of the polyurethane-polyacrylate dispersion the polyurethane dispersion is initially prepared and this polyurethane dispersion is then used as seed for the acrylate dispersion. The acrylate dispersion is preferably polymerized in a semi-batch method.

The preparation of aqueous polymer dispersions by the process of free-radical emulsion polymerization is known per se (cf. Houben-Weyl, Methoden der organischen Chemie, volume XIV, Makromolekulare Stoffe, 1. c., pages 133ff).

Preparing the polyurethane-polyacrylate hybrid dispersions according to the invention comprises (a) initially preparing the polyurethane (P1) and (b) employing the polyurethane (P1) as seed for preparing the acrylate polymer (A1).

A method which has proven particularly advantageous is a feed method which comprises initially charging the polyurethane (P1) and a portion of the initiator, incipiently polymerizing this initial charge for a few minutes and then carrying out the polymerization up to a point of substantially complete conversion by continuous addition of the remaining initiator and the monomers M1, M2 and M3 as a pure monomer mixture or in the form of a monomer emulsion in water. A further embodiment comprises initially charging the polyurethane (P1) and adding by simultaneous metered addition a portion of the monomer mixture and a portion of the initiator to initiate the polymerization. After complete or partial reaction of the monomers, the remaining monomer mixture is then added and the polymerization is carried out up to a point of substantially complete conversion.

Here, the monomers may be distributed over a plurality of feed points and provided with a variable rate of metered addition and/or a variable content of one or more monomers.

A further embodiment comprises initially charging the polyurethane (P1) and adding the total amount of the initiator to initiate the polymerization. After a few minutes, monomers M1, M2 and M3 are added as a pure monomer mixture or in the form of a monomer emulsion in water and the polymerization is carried out up to a point of substantially complete conversion.

A further embodiment comprises initially charging the polyurethane (P1) and adding the total amount of the oxidant component of a redox initiator system. Said embodiment further comprises subsequently metering into the resulting mixture the monomers M1, M2 and M3 as a pure monomer mixture or in the form of a monomer emulsion in water and, simultaneously, the reducing agent component of a redox initiator system and carrying out the polymerization up to a point of substantially complete conversion.

A further embodiment comprises initially charging the polyurethane (P1) and metering into this initial charge the oxidant component of a redox initiator system, the monomers M1, M2 and M3 as a pure monomer mixture or in the form of a monomer emulsion in water and, simultaneously, the reducing agent component of a redox initiator system and carrying out the polymerization up to a point of substantially complete conversion.

In all embodiments the monomers may be distributed over a plurality of feed points and provided with a variable rate of metered addition and/or a variable content of one or more monomers.

Molecular weight regulators may optionally also be present. As a result of the presence of regulators in a polymerization, through chain termination and commencement of a new chain, the new free radical that is formed has the effect, generally, of reducing the molecular weight of the resultant polymer and, when crosslinkers are present, of also reducing the number of crosslinking sites (crosslinking density). When the concentration of regulator is increased in the course of a polymerization, the crosslinking density is reduced further in the course of the polymerization.

Such molecular weight regulators are known and examples thereof include mercapto compounds, such as preferably tertiary dodecyl mercaptan, n-dodecyl mercaptan, isooctylmercaptopropionic acid, mercaptopropionic acid, dimeric α-methylstyrene, 2-ethylhexyl thioglycolate (EHTG), 3-mercaptopropyltrimethoxysilane (MTMO) or terpinols. The molecular weight regulators are known and are described, for example, in Houben-Weyl, Methoden der organischen Chemie, vol. XIV/1, p. 297 ff., 1961, Stuttgart.

In accordance with the invention, the polymerization is carried out at a temperature of from 60° C. to 110° C., preferably at from 65° C. to 100° C. and more preferably at from 70° C. to 90° C. The aqueous polymer dispersions thus obtained preferably have a solids content of from 30 to 65 wt %, more preferably from 35 to 55 wt %.

The acrylate dispersion according to the invention is prepared by emulsion polymerization. Emulsion polymerization comprises polymerizing ethylenically unsaturated compounds (monomers) in water using typically ionic and/or nonionic emulsifiers and/or protective colloids or stabilizers as surface-active compounds to stabilize the monomer droplets and the polymer particles subsequently formed from the monomers. However, according to the invention the polymerization is effected in a low-emulsifier regime. Preference is given to using emulsifier in a total amount of less than 2.5 or 2.0 wt % and more particularly less than 1.5 wt % based on the solids content of the polymer dispersion.

The polymer dispersion is typically prepared in the presence of at least one surface-active compound. An extensive description of suitable protective colloids may be found in Houben-Weyl, Methoden der organischen Chemie, volume XIV/1, Makromolekulare Stoffe, Georg Thieme Verlag, Stuttgart, 1961, pp. 411 to 420. Suitable emulsifiers may also be found in Houben-Weyl, Methoden der organischen Chemie, volume 14/1, Makromolekulare Stoffe, Georg Thieme Verlag, Stuttgart, 1961, pp. 192 to 208.

Suitable emulsifiers are not only anionic and cationic emulsifiers but also nonionic emulsifiers. It is preferred when the surface-active substances employed are emulsifiers having relative molecular weights less than those of protective colloids. It has proven particularly advantageous to employ exclusively anionic emulsifiers or a combination of at least one anionic emulsifier and at least one nonionic emulsifier.

Useful nonionic emulsifiers are araliphatic or aliphatic nonionic emulsifiers, for example ethoxylated mono-, di- and trialkylphenols (EO degree: from 3 to 50, alkyl radical: $C_4$-$C_{10}$), ethoxylates of long-chain alcohols (EO degree: from 3 to 100, alkyl radical: $C_8$-$C_{36}$) and polyethylene oxide/polypropylene oxide homo- and copolymers. These may comprise the alkylene oxide units in random distribution or in the form of blocks. Very suitable are, for example, EO/PO block copolymers. Preference is given to ethoxylates of long-chain alkanols (alkyl radical $C_1$-$C_{30}$, mean degree of ethoxylation from 5 to 100) and, among these, particular preference is given to those comprising a linear $C_{12}$-$C_{20}$ alkyl radical and having a mean degree of ethoxylation of from 10 to 50 and also to ethoxylated monoalkylphenols.

Suitable anionic emulsifiers are, for example, alkali metal and ammonium salts of alkyl sulfates (alkyl radical: $C_8$-$C_{22}$), of sulfuric monoesters of ethoxylated alkanols (EO degree: from 2 to 50, alkyl radical: $C_{12}$-$C_{18}$) with ethoxylated alkylphenols (EO degree: from 3 to 50, alkyl radical:

$C_4$-$C_9$), of alkylsulfonic acids (alkyl radical: $C_{12}$-$C_{18}$) and of alkylarylsulfonic acids (alkyl radical: $C_9$-$C_{18}$). Further suitable emulsifiers may be found in Houben-Weyl, Methoden der organischen Chemie, volume XIV/1, Makromolekulare Stoffe, Georg-Thieme-Verlag, Stuttgart, 1961, pp. 192-208. Likewise suitable as anionic emulsifiers are bis(phenylsulfonic acid) ethers and the alkali metal or ammonium salts thereof which bear a $C_4$-$C_{24}$ alkyl group on one or both aromatic rings. These compounds are generally known, for example from U.S. Pat. No. 4,269,749, and commercially available, for example as Dowfax® 2A1 (Dow Chemical Company).

Suitable cationic emulsifiers are preferably quaternary ammonium halides, for example trimethylcetylammonium chloride, methyltrioctylammonium chloride, benzyltriethylammonium chloride or quaternary compounds of N—$C_6$-$C_{20}$-alkylpyridines, -morpholines or -imidazoles, for example N-laurylpyridinium chloride.

Customary assistants and additives may also be added to the polymer dispersions. These include, for example, pH modifiers, reducing and bleaching agents, for example the alkali metal salts of hydroxymethanesulfinic acid (e.g. Rongalit® C from BASF Aktiengesellschaft), complexing agents, deodorants, odorants and viscosity modifiers such as alcohols, for example glycerol, methanol, ethanol, tert-butanol, glycol etc. These assistants and additives may be added to the polymer dispersions in the initial charge, to one of the feeds or once polymerization has ended.

Acid groups of the first polymer are preferably neutralized by at least partial feeding of a neutralizing agent before and/or during the polymerization of the second stage. This neutralizing agent may be added in a common feed with the monomers to be polymerized, or in a separate feed. After feeding of all of the monomers, the polymerization vessel preferably comprises the amount of neutralizing agent required for neutralizing at least 10% and preferably from 25% to 100% or from 50% to 95% acid equivalents.

The initiator system according to the invention is to be understood as meaning, for example, water-soluble or else oil-soluble initiators which may be used to initiate the emulsion polymerization. Water-soluble initiators are, for example, ammonium and alkali metal salts of peroxodisulfuric acid, for example sodium peroxodisulfate, hydrogen peroxide or organic peroxides, for example tert-butyl hydroperoxide or water-soluble azo compounds, for example 2,2'-azobis(2-amidinopropane) dihydrochloride or 2,2'-azobis(N,N'-dimethyleneisobutylamidine). Also suitable as initiator are reduction-oxidation (redox) initiator systems. Redox initiator systems consist of at least one generally inorganic reducing agent and an inorganic or organic oxidizing agent. The oxidant component is, for example, the emulsion polymerization initiators already mentioned hereinabove. The reductant components are, for example, alkali metal salts of sulfurous acid, for example sodium sulfite, sodium hydrogensulfite, alkali metal salts of disulfurous acid such as sodium disulfite, bisulfite addition compounds of aliphatic aldehydes and ketones, such as acetone bisulfite or reducing agents such as hydroxymethanesulfinic acid and the salts thereof and ascorbic acid. The redox initiator systems may be employed with co-use of soluble metal compounds whose metallic component may appear in a plurality of oxidation states. Typical redox initiator systems are, for example, ascorbic acid/iron(II) sulfate/sodium peroxydisulfate, tert-butyl hydroperoxide/sodium disulfite, tert-butyl hydroperoxide/sodium hydroxymethanesulfinate. The individual components, for example the reductant component, may also be mixtures, for example a mixture of the sodium salt of hydroxymethanesulfinic acid and sodium disulfite.

Examples of typical oil-soluble radical initiators include peroxo and azo compounds, for example tert-butyl perpivalate, tert-butyl peroxyneodecanoate, tert-amyl peroxypivalate, dilauryl peroxide, tert-amyl peroxy-2-ethylhexanoate, tert-amyl perneodecanoate, 2,2'-azobis(2,4-dimethyl)valeronitrile, 2,2'-azobis(2-methylbutyronitrile), dioctanoyl peroxide, didecanoyl peroxide, diacetyl peroxide, dibenzoyl peroxide, tert-butyl per-2-ethylhexanoate, di-tert-butyl peroxide, 2,5-dimethyl-2,5-di(tert-butylperoxy)hexane, dimethyl 2,2-azobisisobutyrate, azobis(2,4-dimethylvaleronitrile), azobis(isobutyronitrile), 2,2'-azobis(2-methylbutyronitrile) and cumene hydroperoxide. These oil-soluble initiators may undergo thermal decomposition either alone or in mixtures or by addition of reducing agents as is described in the case of the water-soluble initiators.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half-life of 10 hours at a temperature range of from 30° C. to 100° C.

The initiators cited are generally employed in the form of aqueous solutions or dispersions or as an oily substance with or without solvent, the lower concentration limit being determined by the amount of water acceptable in the dispersion and the upper limit being determined by the solubility in water of the particular compound. The concentration of the active initiators is generally from 0.1 to 30 wt %, preferably from 0.2 to 20 wt % and more preferably from 0.3 to 10 wt % based on the monomers to be polymerized. It is also possible to use two or more different initiators in the emulsion polymerization.

The polymerization medium may consist either solely of water or of mixtures of water and liquids miscible therein such as methanol. Preference is given to using solely water. The emulsion polymerization may be carried out either as a batch process or in the form of a feed process, including the staged and gradient operating modes of a feed process.

The manner in which the initiator is added to the polymerization vessel over the course of the free-radical aqueous emulsion polymerization is known to those of ordinary skill in the art. It may be either initially charged to the polymerization vessel in its entirety or employed continuously or in a staged manner at the rate of its consumption over the course of the free-radical aqueous emulsion polymerization. This specifically depends on the chemical nature of the initiator system and on the polymerization temperature. Preference is given to initially charging a portion and supplying the remainder to the polymerization zone at the rate of its consumption.

The emulsion polymerization generally affords aqueous dispersions of the polymer having solids contents of from 15 to 75 wt %, preferably from 40 to 75 wt % and more preferably not less than 50 wt %. Dispersions having a very high solids content are preferred for a high reactor space/time yield. In order that solids contents of >60 wt % may be achieved, a bi- or polymodal particle size should be established since otherwise the viscosity becomes too high and the dispersion can no longer be handled. A new generation of particles may be produced, for example, by addition of seed (EP 81083), by addition of excess emulsifier or by addition of miniemulsions. A further advantage associated with low viscosity at high solids content is improved coating characteristics at high solids contents. Production of (a) new particle generation(s) may be effected at any point in time. It is guided by the particle-size distribution that is sought for a low viscosity.

It is often advantageous when the aqueous polymer dispersion obtained when the polymerization steps have ended is subjected to aftertreatment to reduce the residual monomer content. This aftertreatment is effected either chemically, for example by completing the polymerization reaction using a more effective free-radical initiator system (known as postpolymerization), and/or physically, for example by stripping the aqueous polymer dispersion with steam or inert gas. Appropriate chemical and/or physical methods are familiar to those skilled in the art [see, for example, DE-AS 12 48 943, DE-A 196 21 027, EP-A 771 328, DE-A 196 24 299, DE-A 196 21 027, DE-A 197 41 184, DE-A 197 41 187, DE-A 198 05 122, DE-A 198 28 183, DE-A 198 39 199, DE-A 198 40 586 and 198 47 115]. Here, a combination of chemical and physical aftertreatment has the advantage that it removes from the aqueous polymer dispersion not only the unconverted ethylenically unsaturated monomers but also other disruptive volatile organic constituents (VOCs). The dispersions according to the invention are preferably not chemically aftertreated.

In the feed process, the individual emulsion polymerization components may be added to the reactor from above, from the side or from below through the reactor floor.

The aqueous hybrid dispersions obtainable by the process according to the invention comprise polymer particles having a weight average particle diameter $D_w$ in the range of from $\geq 10$ to $\leq 500$ nm, preferably from $\geq 20$ to $\leq 400$ nm and more specifically from $\geq 30$ nm to $\leq 300$ nm. Determination of the weight average particle diameters is known to those skilled in the art and is carried out, for example, by the analytical ultracentrifugation method. Throughout this specification the term weight average particle diameter is to be understood as meaning the weight average $D_{w50}$ value determined according to the analytical ultracentrifugation method (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

The polyurethane-acrylate hybrid dispersions obtainable according to the invention and having weight average particle diameters $D_w$ of $\leq 400$ nm exhibit surprisingly good flexibility even at low temperatures and are thus particularly suitable as binders for flexible roof coatings and other coating applications.

The corresponding polymer powders are moreover easily obtainable from the aqueous polymer dispersions according to the invention (e.g. by freeze- or spray-drying). These polymer powders obtainable according to the invention may also be used as components in the preparation of coating materials for flexible roof coatings and other coating applications including modification of mineral binders.

The aqueous polymer dispersion has a typical solids content of from 30 to 65 wt %, preferably from 35 to 55 wt %.

The aqueous polyurethane-polyacrylate hybrid dispersion obtained may be used as such or mixed with further, generally film-forming, polymers as a binder composition in aqueous coating materials.

It will be appreciated that the aqueous hybrid dispersions according to the invention obtainable by the process according to the invention may also be employed as a component in the preparation of adhesives, sealants, polymeric renders, papercoating slips, fiber webs and coating materials for organic substrates and also for modifying mineral binders.

The invention further provides a coating material in the form of an aqueous composition comprising
at least one polyurethane-polyacrylate hybrid dispersion according to the invention as defined hereinabove,
optionally at least one (in)organic filler and/or at least one (in)organic pigment,
optionally at least one customary assistant and
water.

The binder compositions according to the invention are employed in elastic paints, pasty tile adhesives, wetroom seals, flooring adhesives, primers, cementitious sealing slurries, sealants, mounting adhesives or in flexible roof coatings, preferably in aqueous paints, particularly in flexible roof coatings and architectural coatings.

Fillers may be employed to enhance hiding power and/or to economize on white pigments. Blends of fillers and color pigments are preferably used to control the hiding power of the hue and the depth of shade.

Suitable pigments are, for example, inorganic white pigments such as titanium dioxide, preferably in the form of rutile, barium sulfate, zinc oxide, zinc sulfide, basic lead carbonate, antimony trioxide, lithopone (zinc sulfide+barium sulfate) or colored pigments, for example iron oxides, carbon black, graphite, zinc yellow, zinc green, ultramarine, manganese black, antimony black, manganese violet, Prussian blue or Paris green. In addition to the inorganic pigments, the dispersion paints according to the invention may also comprise organic color pigments, for example sepia, gamboge, Cassel brown, toluidine red, para-red, Hansa yellow, indigo, azo dyes, anthraquinonoid and indigoid dyes and also dioxazine, quinacridone, phthalocyanine, isoindolinone and metal-complex pigments. Also suitable are synthetic white pigments with air inclusions to enhance light scattering, such as the Ropaque® and AQA-Cell® dispersions. Additionally suitable are the Luconyl® brands from BASF SE, for example Luconyl® yellow, Luconyl® brown and Luconyl® red, particularly the transparent versions.

Suitable fillers are, for example, aluminosilicates, such as feldspars, silicates, such as kaolin, talc, mica, magnesite, tobermorite, xonolite, alkaline earth metal carbonates, such as calcium carbonate, for example in the form of calcite or chalk, magnesium carbonate, dolomite, alkaline earth metal sulfates, such as calcium sulfate, silicon dioxide etc. The preference in flexible roof coatings and in paints is naturally for finely divided fillers. The fillers may be employed as individual components. In practice however, filler mixtures have proven particularly advantageous, for example calcium carbonate/kaolin, calcium carbonate/talc. Glossy coating materials generally comprise only small amounts of very finely divided fillers or comprise no fillers.

Finely divided fillers may also be employed to enhance hiding power and/or to economize on white pigments. Blends of fillers and color pigments are preferably used to control the hiding power of the hue and the depth of shade.

The hybrid binders according to the invention achieve a particularly high breaking strength without particular disadvantages in terms of breaking elongation when particularly finely divided fillers are employed, for example calcium carbonate having a mean particle size of $\leq 2$ µm. Such products are often also available in already predispersed form as a slurry in water and this makes it possible to prepare paint particularly easily. Suitable calcium carbonate slurries are obtainable, for example, from Omya, Oftringen, Switzerland under the trade name Hydrocarb, for example Hydrocarb 95 having a mean particle size of 0.7 µm.

The proportion of pigments may be described by the pigment volume concentration (PVC). Elastic roof coating materials according to the invention have, for example, a PVC in the range of from 10 to 40, it being appreciated that the binders are also suitable for use in clear lacquer applications comprising no or only very small proportions of added pigments and/or fillers. The elasticity (breaking elongation) generally increases with increasing quantities of binder in the coating.

The coating material according to the invention for flexible roof coating and aqueous paints may comprise further assistants in addition to the polymer dispersion.

Typical assistants include, in addition to the emulsifiers employed in the polymerization, wetting agents or dispersants, such as sodium, potassium or ammonium polyphosphates, alkali metal and ammonium salts of acrylic or maleic anhydride copolymers, polyphosphonates, such as sodium 1-hydroxyethane-1,1-diphosphonate and the salts of naphthalenesulfonic acids, in particular the sodium salts thereof.

Further suitable assistants are flow control agents, defoamers, biocides and thickeners. Suitable thickeners are, for example, associative thickeners, such as polyurethane thickeners. The amount of thickener is preferably less than 1 wt % and more preferably less than 0.6 wt % of thickener based on the solids content of the paint.

Further suitable assistants are film-forming assistants and coalescence aids. Preference is given to using, for example, mineral spirits, ethylene glycol, propylene glycol, glycerine, ethanol, methanol, water-miscible glycol ethers and acetates thereof such as diethylene glycol, 1-methoxy-2-propanol, 2-amino-2-methyl-1-propanol, isooctanol, butyl glycol, butyl diglycol, diethylene glycol monobutyl ether, dipropylene glycol monomethyl or monobutyl ether, dipropylene glycol methyl ether, dipropylene glycol propyl ether, dipropylene glycol n-butyl ether, tripropylene glycol n-butyl ether, propylene glycol phenyl ether, butyl glycol acetate, butyl diglycol acetate, 2,2,4-trimethyl-1,3-pentanediol monoisobutyrate, diisobutyl esters of long-chain dicarboxylic acids such as Lusolvan® FBH or tripropylene glycol monoisobutyrate.

Further suitable assistants are mineral binders such as various cements and also tackifier resins such as colophony resin, esters of colophony resin or mixtures thereof.

The paints according to the invention are prepared in known fashion by blending the components in customary mixers. A procedure which has proven particularly advantageous comprises preparing an aqueous paste or dispersion from the pigments, water and optionally the auxiliaries and only subsequently mixing the polymeric binder, i.e., generally the aqueous dispersion of the polymer, with the pigment paste or dispersion respectively.

The paints according to the invention generally comprise from 30 to 75 wt % and preferably from 40 to 65 wt % of non-volatile constituents. Non-volatile constituents is to be understood as meaning all constituents of the preparation excluding water, but at least the total amount of binder, pigment and assistant based on the solids content of the paint. The volatile constituents are predominantly water.

The paint according to the invention may be applied to substrates in customary fashion, for example by brushing, spraying, dipping, rolling, knifecoating etc.

It is preferably used as a flexible roof coating material, i.e., for coating flat or inclined parts of buildings. These parts of buildings may be mineral substrates such as renders, plaster or plasterboard, masonry or concrete, wood, wood-base materials, metal or polymer, e.g. PVC, thermoplastic polyurethane, EPDM, epoxy resin, polyurethane resin, acrylate resin or bituminous material as coating or continuous sheet material.

The paints according to the invention are notable for their ease of handling, good processing properties and improved elasticity. The paints have a low noxiant content. They have good performance characteristics, for example good fastness to water, good adherence in the wet state, good block resistance, good recoatability and good weathering resistance and they exhibit good flow on application. The equipment used is easily cleaned with water.

The invention is more particularly described with reference to the nonlimiting examples which follow.

The solids contents were generally determined by drying a defined amount of the aqueous polymer dispersion (about 0.8 g) to constant weight (about 2 hours) at a temperature of 130° C. using an HR73 moisture analyzer from Mettler Toledo. Two measurements were carried out in each case. The value reported in each case is the mean of these measurements.

The number-average particle diameters of the polymer particles were generally determined by dynamic light scattering on a 0.005 to 0.01 wt % strength aqueous polymer dispersion at 23° C. using an Autosizer IIC from Malvern Instruments, England. The cumulant z-average diameter of the measured autocorrelation function (ISO standard 13 321) is reported.

The glass transition temperature was determined according to ISO standard 11357-2 with a heating rate of 20 K/min using a "02000" instrument from TA instruments, Newcastle, Del., USA.

POLYURETHANE DISPERSION EXAMPLES

Example 1

456.05 g of a polyester diol of adipic acid, neopentyl glycol and 1,6-hexanediol having an OH number of 56, 39.69 g of a butanol-based polyethylene oxide having an OH number of 15 and 0.1932 g of dibutyltin dilaurate were initially charged into a stirred flask and heated to 60° C. 132.05 g of 4,4'-diisocyanatodicyclohexylmethane and 67.69 g (0.3185 mol) of isophorone diisocyanate were added dropwise thereto over 5 minutes. The resulting mixture was then diluted with 117.20 g of acetone and stirred for 1 hour at 74° C. Subsequently, 20.30 g of 1,4-butanediol were added rapidly and the mixture was further stirred at 74° C. After 2 hours, the mixture was diluted with 500.98 g of acetone and cooled down to 50° C. The NCO content was determined as 1.01 wt % (calculated: 1.00 wt %).

30.81 g of a 50% aqueous solution of the sodium salt of 2-aminoethyl-2-aminoethanesulfonic acid are added over 5 minutes at 50° C. and the mixture is further stirred for an additional 5 minutes. The mixture is then diluted with 743.47 g of water over 24 minutes at 50° C. and then chain-extended with 4.21 g of diethylenetriamine and 2.06 g of isophoronediamine in 36.92 g of water.

After distillation of the acetone, a finely divided dispersion having a solids content of about 45%, a particle size of 91.7 nm and a pH of 9.46 was obtained.

PU/PA Hybrid Dispersion Example

Example 2

A 4 l glass vessel equipped with an anchor stirrer, heating and cooling means and various feed points was initially charged, at from 20° C. to 25° C. (room temperature) and atmospheric pressure (1 atm≙1.013 bar absolute), with 444.44 g of a polyurethane dispersion from Example 1 and this initial charge was heated up to 85° C. A solution of 0.1 g of sodium peroxodisulfate in 4 g of water is added, the resulting mixture is incipiently polymerized for 5 minutes and feeds 1 and 2 are then commenced simultaneously.

Feed 1
73.6 g water
2.5 g 20 wt % aqueous solution of a fatty alcohol polyethoxylate (Lutensol® TO82 from BASF SE)
6.67 g 15 wt % aqueous solution of sodium lauryl sulfate
40 g styrene
58 g n-butyl acrylate
48 g methyl methacrylate
50 g 2-ethylhexyl acrylate
2 g acrylic acid and
4 g 50 wt % aqueous solution of acrylamide
Feed 2
0.9 g sodium peroxodisulfate
35 g water Feed 1 is uniformly metered into the mixture over 120 minutes at 85° C. with stirring and feed 2 is metered in over 135 minutes.

The reaction mixture was subsequently postreacted for 15 minutes at the abovementioned temperature and the mixture was then cooled down to room temperature. The aqueous polymer dispersion obtained was then neutralized with 5 g of a 10 wt % aqueous sodium hydroxide solution. The polymer dispersion obtained had a solids content of 50.5 wt % and a number-average particle diameter of 273 nm.

Example 3

81.94 g of 2-butyl-2-ethyl-1,3-propanediol, 39.69 g of a butanol-based polyethylene oxide having an OH number of 15, 258.76 g of polyTHF 2000 and 0.4 g of tin-free catalyst based on bismuth neodecanoate, 75% in acetone (Borchikat 315, OMG Borchers), were initially charged into a stirred flask and heated to 56° C. 78.9 g of bis(4-isocyanatocyclohexyl)methane and 66.4 g of IPDI were added dropwise thereto over 5 minutes. The resulting mixture was then diluted with 97 g of acetone and stirred for 2 hours and 35 minutes at 74° C. Subsequently, 19.9 g of 1,4-butanediol were added dropwise and the mixture was further stirred at 74° C. After 2 hours and 40 minutes, the mixture was diluted with 417 g of acetone and cooled down to 50° C. The NCO content was determined as 1.25 wt % (calculated: 1.18 wt %).

30.3 g of a 50% aqueous solution of the sodium salt of 2-aminoethyl-2-aminoethanesulfonic acid are added over 5 minutes at 50° C. and the mixture is further stirred for an additional 5 minutes. The mixture is then diluted with 660.6 g of water over 15 minutes at 50° C. and then chain-extended with 4.12 g of DETA and 2.02 g of IPDA in 36.21 g of water.

After distillation of the acetone, a finely divided dispersion having a solids content of about 44.5%, a particle size of 91.8 nm and a pH of 8.03 was comprised.

Example 4

A 4 l glass vessel equipped with an anchor stirrer, heating and cooling means and various feed points was initially charged, at from 20° C. to 25° C. (room temperature) and atmospheric pressure (1 atm≙1.013 bar absolute), with 317.1 g of a polyurethane dispersion from Example 1 and 141 g of water and this initial charge was heated up to 80° C. 14.7 g of methyl methacrylate are added and the resulting mixture is stirred for 30 minutes at 80° C. A solution of 1.5 g of t-butyl hydroperoxide in 3 g of water and 0.06 g of L(+)-ascorbic acid in 4 g of water and 0.024 g of 25% ammonia is added, the mixture is incipiently polymerized for 5 minutes and feeds 1 to 4 are then commenced simultaneously.

Feed 1
30 g styrene
43.5 g n-butyl acrylate
21.3 g methyl methacrylate
37.5 g 2-ethylhexyl acrylate
1.5 g acrylic acid and
Feed 2
3 g 50 wt % aqueous solution of acrylamide
60 g water
Feed 3
13.5 g t-butyl hydroperoxide
27 g water
Feed 4
0.54 g L(+)-ascorbic acid
36 g water
0.216 g 25% ammonia Feeds 1 and 2 are uniformly metered into the mixture over 120 minutes at 80° C. with stirring and feeds 3 and 4 are metered in over 180 minutes.

The reaction mixture was subsequently cooled down to room temperature. The polymer dispersion obtained had a solids content of 37.6 wt % and a number-average particle diameter of 87 nm.

Example 5

A 4 l glass vessel equipped with an anchor stirrer, heating and cooling means and various feed points was initially charged, at from 20° C. to 25° C. (room temperature) and atmospheric pressure (1 atm≙1.013 bar absolute), with 464.04 g of a polyurethane dispersion from Example 1 and this initial charge was heated up to 85° C. A solution of 0.1 g of sodium peroxodisulfate in 4 g of water is added, the resulting mixture is incipiently polymerized for 5 minutes and feeds 1 and 2 are then commenced simultaneously.

Feed 1
73.6 g water
2.5 g 20 wt % aqueous solution of a fatty alcohol polyethoxylate (Lutensol® TO82 from BASF SE)
6.67 g 15 wt % aqueous solution of sodium lauryl sulfate
30 g styrene
62 g n-butyl acrylate
45.5 g methyl methacrylate
56 g 2-ethylhexyl acrylate
2 g acrylic acid and
2 g 2-hydroxypropyl acrylate
0.5 g vinyltriethoxysilane
2 g acetoacetoxyethyl methacrylate
Feed 2
0.9 g sodium peroxodisulfate
35 g water
Feed 3
3 g t-butyl hydroperoxide, 10% in water
Feed 4
3.51 g acetone bisulfite
10 g water Feed 1 is uniformly metered into the mixture over 120 minutes at 85° C. with stirring and feed 2 is metered in over 135 minutes.

Subsequently the reaction mixture was left to cool to 80° C., feed 3 was added and feed 4 was added dropwise over 60 minutes. Then the mixture then cooled down to room temperature. The aqueous polymer dispersion obtained was then neutralized with 5 g of a 10 wt % aqueous sodium hydroxide solution. The polymer dispersion obtained had a solids content of 50.5 wt % and a number-average particle diameter of 141 nm.

Example 6

A 4 l glass vessel equipped with an anchor stirrer, heating and cooling means and various feed points was initially charged, at from 20° C. to 25° C. (room temperature) and atmospheric pressure (1 atm ≙ 1.013 bar absolute), with 179.8 g of a polyurethane dispersion from Example 3 and 90 g of water and this initial charge was heated up to 85° C. A solution of 0.1 g of sodium peroxodisulfate in 4 g of water is added, the resulting mixture is incipiently polymerized for 5 minutes and feeds 1 and 2 are then commenced simultaneously.
Feed 1
117.5 g water
2.5 g 20 wt % aqueous solution of a fatty alcohol polyethoxylate (Lutensol® TO82 from BASF SE)
6.67 g 15 wt % aqueous solution of sodium lauryl sulfate
40 g styrene
58 g n-butyl acrylate
47.6 g methyl methacrylate
50 g 2-ethylhexyl acrylate
2 g acrylic acid and
4 g 50 wt % aqueous solution of acrylamide
0.2 g vinyltriethoxysilane
0.2 g allyl methacrylate
Feed 2
0.9 g sodium peroxodisulfate
35 g water
Feed 3
3 g t-butyl hydroperoxide, 10% in water
Feed 4
3.51 g acetone bisulfite
10 g water Feed 1 is uniformly metered into the mixture over 120 minutes at 85° C. with stirring and feed 2 is metered in over 135 minutes.

The reaction mixture was subsequently left to cool to 80° C., feed 3 was added and feed 4 was added dropwise over 60 minutes. Then the mixture is cooled down to room temperature. The aqueous polymer dispersion obtained was then neutralized with 5 g of a 10 wt % aqueous sodium hydroxide solution. The polymer dispersion obtained had a solids content of 42.6 wt % and a number-average particle diameter of 162 nm.

Example 7

A 4 l glass vessel equipped with an anchor stirrer, heating and cooling means and various feed points was initially charged, at from 20° C. to 25° C. (room temperature) and atmospheric pressure (1 atm ≙ 1.013 bar absolute), with 190 g of a polyurethane dispersion from Example 1 and 80 g of water and this initial charge was heated up to 85° C. A solution of 0.1 g of sodium peroxodisulfate in 4 g of water is added, the resulting mixture is incipiently polymerized for 5 minutes and feeds 1 and 2 are then commenced simultaneously.
Feed 1
87.88 g water
2.5 g 20 wt % aqueous solution of a fatty alcohol polyethoxylate (Lutensol® TO82 from BASF SE)
6.67 g 15 wt % aqueous solution of sodium lauryl sulfate
48 g styrene
48 g n-butyl acrylate
51.6 g methyl methacrylate
44 g 2-ethylhexyl acrylate
2 g acrylic acid and
4 g 50 wt % aqueous solution of acrylamide
Feed 2
0.9 g sodium peroxodisulfate
35 g water
Feed 3
3 g t-butyl hydroperoxide, 10% in water
Feed 4
3.51 g acetone bisulfite
10 g water Feed 1 is uniformly metered into the mixture over 120 minutes at 85° C. with stirring and feed 2 is metered in over 135 minutes.

The reaction mixture was subsequently left to cool to 80° C., feed 3 was added and feed 4 was added dropwise over 60 minutes. Then the mixture then cooled down to room temperature. The aqueous polymer dispersion obtained was then neutralized with 7 g of a 10 wt % aqueous sodium hydroxide solution. The polymer dispersion obtained had a solids content of 43.1 wt % and a mean glass transition temperature of 14.9° C.

Example 8

A 4 l glass vessel equipped with an anchor stirrer, heating and cooling means and various feed points was initially charged, at from 20° C. to 25° C. (room temperature) and atmospheric pressure (1 atm ≙ 1.013 bar absolute), with 183.9 g of a polyurethane dispersion from Example 1 and 215.65 g of water.
Also initially charged are:
96.19 g water
2.5 g 20 wt % aqueous solution of a fatty alcohol polyethoxylate (Lutensol® TO82 from BASF SE)
6.67 g 15 wt % aqueous solution of sodium lauryl sulfate
41 g styrene
58 g n-butyl acrylate
48 g methyl methacrylate
51 g 2-ethylhexyl acrylate
4 g 50 wt % aqueous solution of acrylamide
5.33 g of t-butyl perpivalate, 75% in aliphatics, are then added and the resulting mixture is heated up from 20° C. to 93° C. over 3 hours.

Then the mixture then cooled down to room temperature. The aqueous polymer dispersion obtained was then neutralized with 2 g of a 10 wt % aqueous sodium hydroxide solution. The polymer dispersion obtained had a solids content of 38.8 wt % and a number-average particle diameter of 103 nm.

Performance Testing
a) Preparation of the Paint Formulations

The constituents shown in table 1 (amounts in g) were used to prepare in the order shown from top to bottom at room temperature, with stirring using a disk stirrer at 400-2500 revolutions per minute, the roof membrane formulations based on the exemplary aqueous polymer dispersions.

TABLE 1

Roof membrane formulation

| Roof membrane formulation | A | B | C |
|---|---|---|---|
| Polymer dispersion of Example 2 | 109.0 | 114.0 | 114.0 |
| Wetting agent[1] | 0.8 | 0.8 | 0.8 |
| Defoamer[2] | 1.0 | 1.0 | 1.0 |
| Dispersant[3] | 2.4 | 2.4 | 2.4 |
| Filler[4] | 85.0 | | |
| Filler[5] | | 70.0 | |
| Filler[6] | | | 70.0 |
| Water | | 10.0 | 10.0 |
| Thickener[7] | 0.8 | 0.8 | 0.8 |
| Defoamer[2] | 0.8 | 0.8 | 0.8 |

[1] Lutensol TO 82, BASF SE, Ludwigshafen
[2] Agitan 282, Münzing Chemie GmbH, Heilbronn
[3] Dispex CX 4320, BASF SE, Ludwigshafen
[4] Hydrocarb 95 ME, Omya, Oftringen, Switzerland
[5] Omyacarb 5 GU, Omya, Oftringen, Switzerland
[6] Omyacarb Extra CL, Omya, Oftringen, Switzerland
[7] Rheovis PU 1270, BASF SE, Ludwigshafen Once the last component had been added the mixture was further stirred until all components are homogeneously mixed (about 10 min) and the roof membrane formulation obtained is subsequently transferred into a DAC 400 FVZ Speed Mixer from Hauschild for 0.5 min at 2000 rpm.

The roof membrane formulation has a solids content of about 63-67%, a pigment volume concentration of about 29 and a viscosity of 8000-10 000 mPas (Brookfield, spindle 6, 20 rpm).

b) Preparation of the Coatings and Test Specimens

The abovementioned roof membrane formulation was applied to a teflon-coated substrate in a layer thickness of 1.2 mm with a knife coater. The coatings thus obtained were subsequently dried for 7 days in a conditioning chamber at 50% relative humidity and 23° C. The resulting dry layer thickness is about 0.60 mm. After removal of the coating from the substrate, the required test specimens were cut out with appropriate cutting dies.

c) Tensile Strength, Breaking Strength and Breaking Elongation Testing

Dumbells of size S1 were cut out of the coatings described hereinabove using a cutting die.

Testing was carried out according to DIN 53504. The dumbells are clamped in a tensile/elongation tester from Zwick and subsequently pulled apart at a rate of 200 mm/min until they break.

| Roof membrane formulation | | A | B | C |
|---|---|---|---|---|
| Maximum force | N/mm$^2$ | 4.99 | 2.14 | 3.80 |
| Elongation at maximum force | % | 484 | 575 | 482 |
| Breaking strength | N/mm$^2$ | 4.89 | 2.09 | 3.76 |
| Breaking elongation | % | 484 | 577 | 483 |

The more finely divided the calcium carbonate in the series of roof membrane formulations B→C→A, the greater the maximum force and the breaking strength for the dried formulation. The elongation at maximum force and the breaking elongation is scarcely dependent on the filler particle size.

Further Formulations

| Roof membrane formulation | D | E | F | G | H |
|---|---|---|---|---|---|
| Exemplary dispersion | 4 | 5 | 6 | 7 | 8 |
| Amount of dispersion [g] | 62 | 58 | 63.5 | 63 | 65 |
| Lutensol TO82 | 0.4 | 0.4 | 0.4 | 0.4 | 0.4 |
| Agitan 282 | 0.5 | 0.5 | 0.5 | 0.5 | 0.5 |
| Dispex CX 4320 | 1.2 | 1.2 | 1.2 | 1.2 | 1.2 |
| Omyacarb 5GU | 29 | 36.5 | 34 | 34 | 31.5 |
| Water | 6 | 3 | 0 | 0 | 0 |
| Rheovis PU 1270 | 0.5 | 0.2 | 0.4 | 0.4 | 0.4 |
| Agitan 282 | 0.4 | 0.4 | 0.4 | 0.4 | 0.4 |

| | | Roof membrane formulation | | | | |
|---|---|---|---|---|---|---|
| | | D | E | F | G | H |
| Maximum force | N/mm$^2$ | 2.15 | 1.90 | 1.99 | 3.02 | 1.78 |
| Elongation at maximum force | % | 780 | 826 | 503 | 386 | 877 |
| Breaking strength | N/mm$^2$ | 2.13 | 1.90 | 3, 1, 96 | 3.02 | 1.77 |
| Breaking elongation | % | 782 | 827 | 505 | 386 | 878 |

All roof membrane formulations comprising the hybrid dispersions show a very high extensibility of more than 500% and breaking strengths of about 2 N/mm$^2$. Employing an acrylate phase with a relatively high glass transition temperature makes it possible to achieve a relatively high breaking elongation (roof membrane formulation G) at the expense of breaking elongation.

Applications and Corresponding Formulations Comprising PU/PA Hybrid

| | pasty tile adhesive | wetroom seal | flooring adhesive | primer | cementitious sealing slurries | sealant | mounting adhesive |
|---|---|---|---|---|---|---|---|
| PU/PA hybrid (50%) | 7-30 | 30-60 | 30-60 | 20-40 | 25-40 | 20-40 | 40-60 |
| mineral binders | | | | | 5-25 | | |
| fillers and pigments | 69-92 | 39-69 | 30-60 | | 33-69 | 35-79 | 34-54 |
| formulating additives | 0.5-2 | 0.5-2 | 0.5-2 | 0.5-2 | 0.5-2 | 0.5-2 | 0.5-4 |
| water | 0-10 | 0-10 | 0-10 | 59-79 | 0-10 | | |
| tackifier resin | | | | 10-20 | | | 5-10 |

The invention claimed is:

1. An aqueous polyurethane-polyacrylate hybrid dispersion obtained by radical polymerization of an acrylate polymer (A1) in the presence of at least one polyurethane (P1) and at least one initiator system,
   wherein the at least one polyurethane (P1) has a content of polyalkylene oxide of at least 10 g/kg of polyurethane and a content of a sulfonated material of at least 25 mmol per kg of polyurethane and the acrylate polymer (A1) has a glass transition temperature of from −50° C. to 50° C. and the mass fraction of the polyurethane is at least 5% and no more than 95% based on the total weight of the polyurethane-polyacrylate hybrid,
   wherein the acrylate polymer (A1) comprises
   (a) at least two monomers M1 having a glass transition temperature of ≥25° C., and
   (b) at least two monomers M2 having a glass transition temperature of ≤25° C., and
   (c) optionally a monomer M3,
   wherein the polyurethane-polyacrylate hybrid dispersions comprise long-chain alkanol-based polyethylene oxides and sodium salts of 2-aminoethyl-2-aminoethanesulfonic acid.

2. The aqueous polyurethane-polyacrylate hybrid dispersion according to claim 1, wherein the at least two monomers M1 are selected from the group consisting of vinylaromatic compounds, C1 to C4 alkyl methacrylates vinyl acetate, ethylenically unsaturated nitriles, vinyl halides, vinyl ethers, hydrocarbons comprising from 4 to 8 carbon atoms and two olefinic double bonds and mixtures thereof.

3. The aqueous polyurethane-polyacrylate hybrid dispersion according to claim 1, wherein the at least two monomers M1 are selected from styrene/methyl methacrylate or cyclohexyl methacrylate/methyl methacrylate.

4. The aqueous polyurethane-polyacrylate hybrid dispersion according to claim 1, wherein the at least two monomers M2 are selected from the group consisting of the C1 to C20 alkyl acrylates, CS to C20 alkyl methacrylates, vinyl esters of unbranched or branched carboxylic acids comprising from 2 to 11 carbon atoms, and vinyl esters of α-branched monocarboxylic acids comprising 9 carbon atoms, vinyl esters of α-branched monocarboxylic acids comprising 10 or 11 carbon atoms, and vinyl esters of branched monocarboxylic acids comprising from 10 to 13 carbon atoms, C1-C20 vinyl ethers, butadiene, vinylidene chloride and butanediol monoacrylate.

5. The aqueous polyurethane-polyacrylate hybrid dispersion according to claim 1, wherein the at least two monomers M2 are selected from the group consisting of n-butyl acrylate/ethylhexyl acrylate.

6. The aqueous polyurethane-polyacrylate hybrid dispersion according to claim 1, wherein the monomers M3 are selected from the group consisting of acrylic acid, methacrylic acid, acrylamide, hydroxyethyl (meth)acrylate or hydroxypropyl (meth)acrylate.

7. The aqueous polyurethane-polyacrylate hybrid dispersion according to claim 1, wherein the acrylate polymer (A1) comprises from 10% to 20% of monomers M1 as calculated based on methyl methacrylate/styrene, 70-88% of monomers M2 as calculated on n-butyl acrylate/2-ethylhexyl acrylate and from 0.1% to 10% of monomer M3, wherein the amount of styrene in the case of monomers M1 is in the range of 5-15%.

8. The aqueous polyurethane-polyacrylate hybrid dispersion according to claim 1, wherein the acrylate polymer (A1) comprises from 35% to 50% of the at least two monomers M1 as calculated based on methyl methacrylate/styrene, 49-59% of the at least two monomers M2 as calculated on n-butyl acrylate/2-ethylhexyl acrylate and 0.1% to 10% of monomer M3, wherein the amount of styrene in the case of monomers M1 is in the range of 10-20%.

9. The aqueous polyurethane-polyacrylate hybrid dispersion according to claim 1, wherein the acrylate polymer (A1) comprises from 37% to 47% of the at least two monomers M1 as calculated based on methyl methacrylate/styrene, 48-58% of the at least two monomers M2 as calculated on n-butyl acrylate/2-ethylhexyl acrylate and from 0.1% to 10% of monomers M3, wherein the amount of styrene in the case of monomers M1 is in the range of 10-25%.

10. The aqueous polyurethane-polyacrylate hybrid dispersion according to claim 1, wherein the acrylate polymer (A1) comprises from 60% to 70% of the at least two monomers M1 as calculated based on methyl methacrylate/styrene, 24-34% of the at least two monomers M2 as calculated on n-butyl acrylate/2-ethylhexyl acrylate and from 0.1% to 10% of monomers M3, wherein the amount of styrene in the case of monomers M1 is in the range of 10-25%.

11. The aqueous polyurethane-polyacrylate hybrid dispersion according to claim 1, wherein the acrylate polymer (A1) comprises principal monomer combinations selected from the group consisting of styrene/2-ethylhexyl acrylate, styrene/n-butyl acrylate, methyl methacrylate/n-butyl acrylate and mixtures thereof.

12. A process for preparing an aqueous polyurethane-polyacrylate hybrid dispersion according to claim 1, wherein said process comprises
   (a) initially preparing the polyurethane (P1), and
   (b) then employing the polyurethane (P1) as seed for preparing the acrylate polymer (A1).

13. The aqueous polyurethane-polyacrylate hybrid dispersion according to claim 1, wherein the acrylate polymer is polymerized in a semi-batch process.

14. A filled coating material, comprising:
   the aqueous polyurethane-polyacrylate hybrid dispersion according to claim 1 as a binder.

15. A pasty tile adhesive, wetroom seal, flooring adhesive, primer, cementitious sealing slurry, sealant, mounting adhesive, architectural coating or flexible roof coating, comprising:
   the aqueous polyurethane-polyacrylate hybrid dispersion according to claim 1 as a binder.

16. A flexible roof coating, comprising:
   the aqueous polyurethane-polyacrylate hybrid dispersion according to claim 1 as a binder.

17. An architectural coating, comprising:
   the aqueous polyurethane-polyacrylate hybrid dispersion according to claim 1 as a binder.

18. The filled coating materials according to claim 14, wherein the PVC of the coating material is from 10 to 40.

19. A coating composition, comprising:
   at least one aqueous polymer dispersion according to claim 1,
   optionally, at least one (in)organic filler and/or at least one (in)organic pigment,
   optionally, at least one customary assistant, and
   water.

20. A flexible roof coating, comprising:
   the coating composition according to claim 19.

21. An architectural coating, comprising:
   the coating composition according to claim 19.

22. A coated surface, of which at least a portion is covered with an aqueous polyurethane-polyacrylate hybrid dispersion according to claim 1.

23. A building material substrate, comprising:
a main surface of which at least a portion is covered with an aqueous polyurethane-polyacrylate hybrid dispersion according to claim 1.

24. An outer flexible roof coating composition, comprising:
the aqueous polyurethane-polyacrylate hybrid dispersion according to claim 1.

* * * * *